United States Patent
Tosaya et al.

(10) Patent No.: US 9,250,445 B2
(45) Date of Patent: Feb. 2, 2016

(54) MULTIPLE-PIXEL-BEAM RETINAL DISPLAYS

(76) Inventors: Carol Ann Tosaya, Los Altos Hills, CA (US); John William Sliwa, Los Altos Hills, CA (US)

( * ) Notice: Subject to any disclaimer, the term of this patent is extended or adjusted under 35 U.S.C. 154(b) by 162 days.

(21) Appl. No.: 13/569,179

(22) Filed: Aug. 8, 2012

(65) Prior Publication Data

US 2014/0043320 A1    Feb. 13, 2014

(51) Int. Cl.
*G09G 5/00* (2006.01)
*G03H 1/00* (2006.01)
*G02B 27/01* (2006.01)
*G02B 27/00* (2006.01)

(52) U.S. Cl.
CPC ........ *G02B 27/0172* (2013.01); *G02B 27/0093* (2013.01); *G02B 2027/0178* (2013.01)

(58) Field of Classification Search
CPC ............. G06T 19/006; G02B 27/0101; G02B 27/017; G02B 27/0103; H04N 13/0409
USPC .............................. 345/7, 8, 633; 359/13, 464
See application file for complete search history.

(56) References Cited

U.S. PATENT DOCUMENTS

| | | | | |
|---|---|---|---|---|
| 4,558,255 A * | 12/1985 | Genovese et al. | ............ | 313/497 |
| 7,428,095 B1 * | 9/2008 | Seitel et al. | ................... | 359/297 |
| 8,503,087 B1 * | 8/2013 | Amirparviz | ................... | 359/630 |
| 2001/0011968 A1 * | 8/2001 | Tidwell | .............................. | 345/8 |
| 2006/0033992 A1 * | 2/2006 | Solomon | ........................ | 359/462 |
| 2008/0143963 A1 * | 6/2008 | Lindacher | ...................... | 351/246 |
| 2009/0212692 A1 * | 8/2009 | Hasegawa | ..................... | 313/504 |
| 2011/0018903 A1 * | 1/2011 | Lapstun et al. | ............... | 345/633 |
| 2011/0102874 A1 * | 5/2011 | Sugiyama et al. | ......... | 359/205.1 |

* cited by examiner

*Primary Examiner* — Kee M Tung
*Assistant Examiner* — Yi Yang

(57) ABSTRACT

A multiple-pixel-beam retinal display (MPBRD) system comprises a near-eye or on-eye display system which delivers any one or more of 2D or 3D images or data to at least one of a user's retinas using a bundle of simultaneously—and differently—statically directed light beams. Each individual beam is of low or no divergence and each angularly fixed beam of the bundle originates from a different corresponding source-image pixel and is delivered through a display-system exit aperture each at static, fixed angles. The bundle of differently statically directed, individually low- or no-divergence pixel beams can be overlaid upon a user's eye-entrance pupil.

19 Claims, 7 Drawing Sheets

MULTIPLE-PIXEL-BEAM RETINAL DISPLAYS

FIELD

Near-eye and on-eye graphical displays allow a user to view and/or interact with graphical 2D and 3D data without having to sit in front of a desktop or laptop display or use his/her hands to manipulate a smartphone or tablet keyboard or display. The invention herein offers a near- or on-eye display system which is very light and compact, of low to moderate cost and is capable of high-definition image presentation. Prior-art near-eye and on-eye display prototypes seen over the last decade are expensive, fragile, bulky and/or of mediocre resolution and brightness.

BACKGROUND

Near-eye displays include whole-image-projection type displays and retinal beam-scanning displays. HUD-type image-projection displays essentially utilize a 2D panel display (or beam-written screen) of some sort and bulky relay optics and mirrors to pass the entire 2D image from the source display to the user's eye(s). Typically, the source of the 2D image is a small 2D SVG, XGA, UXGA or HD multipixel source display mounted on the side of the user's head along with a bulky optics train comprising several lenses and mirrors that are used to relay the projected 2D image from the image-display source to a semitransparent half mirror placed in front of the user's eye. Frequently, the HUD artificial-image content is displayed at a comfortable distance (under 1 meter to infinity) as perceived by the user; thus, the complex lens train is required. Head-up Displays (HUDs) of this type originally were developed for military fighter pilots and are in current use, such as in the Apache gunship and in many civilian aircraft. All such HUD displays relay the entire 2D image space of a real source display to the eye in a manner which makes it appear to the user that the content of the HUD display is projected upon the real surroundings or is projected adjacent to the surroundings. HUDs can allow visualization of both artificial HUD display data content such as aircraft instrument readings as well as of the real surroundings if a semitransparent projection surface is used or if the two image types do not overlap within the field of view. It is exceedingly difficult to provide bright, high-resolution HUD images and compactness as well as light weight and low cost at the same time. The brightness issue is particularly difficult in surrounding bright sunlight.

It is important to recognize that whether the HUD source display (the display whose image is relayed via optics) is a conventional 2D LCD or OLED display with frame-wise updates or is a laser or LED beam-written display using a pixel-by-pixel scanning beam, the entire 2D source-image space always is imaged by the HUD lens train which utilizes refractive (or diffractive) lenses and mirrors which simultaneously optically convolute then deconvolute the entire object image into the observed destination image. Typically, the source display has image persistence or significant emission duty cycle such that the entire display frame is always visible to the human user's eyeball which has its own fusion persistence. So, the key point is that with HUDs the eye sees an image which is refreshed as a whole, at least full pixel lines at a time, as opposed to being serially written pixel by pixel without display persistence. That requires the relay lens train to handle the ray traces coming from all the source pixels simultaneously in the form of a complete image or line of pixels which is convoluted then deconvoluted by the lenses in the known manner of conventional geometric optics and at any instant spans the entire lens diameter.

Retinal beam-writing displays, known as Virtual Retinal Displays or VRDs, rather than simultaneously relaying a whole 2D image of a real source display to the eye(s), serially write, pixel by pixel, the 2D image upon the retina(s) directly. There is no real 2D physical source display involved and therefore no source display persistence, but instead a micromechanical or MEMs-type 2D-mirror beam scanner scans a computer-controlled, dynamically changing, single writing beam fed by combined modulating red, green and blue lasers or LEDs. In this type of display, the image serially enters the eye pixel by pixel to the retina, and the projection geometry upon the retina is very dependent upon the angles through which the writing beam is scanned and upon the proper placement of the VRD's exit pupil at or within the user's eye entrance pupil. Typically the VRD eye-entering sequentially placed beams are divergent from each other inside the eye, resulting in a retinal image that is significantly larger than the eye pupil itself. Such VRD displays typically are lighter and more compact than HUDs, however the scanning mirror(s) and ganged primary red, green and blue light sources and the color combiner(s) can be expensive and fragile and the user's eye pupil must overlay the VRG's exit pupil at all times in order to see the scanning VRD image-writing beam. Note also that eye movements or any unintended vibration of the steering mirrors can result in image distortions during the writing of a single-image frame upon the retina.

Display of fast-moving video also can be an issue for VRDs as pixel-by-pixel beam writing is much slower than the 2D image-wise projection of HUDs. We specifically point out that the VRD beam scanner directs its single angulating scanning beam through any intervening lenses or mirrors (usually numbering fewer and smaller than for HUDs) as a single, small, low-divergence beam such that at any moment there is no light-ray convolution and deconvolution (as for 2D whole-image formation through lenses) as there is for the HUD optics which pass entire 2D images at a single instant. Thus, the VRD beam is of very small diameter (typically less than 1 mm before pupil entrance), of near zero divergence (ideally less than a couple minutes of arc) and it will often be even smaller in diameter upon retinal impact due to the additional focusing effects of the user's cornea and lens. The takeaway point here is that, at any moment, only one very narrow scanned beam passes through a very tiny portion of any lenses such that there is no full-image convolution and deconvolution occurring as the beam follows a unique raytrace path through the lenses.

Herein we combine these seemingly incompatible technologies to provide a massively parallel beam-writing display wherein each intended retinal image pixel is written and updated by its own spatially static, properly directed and dedicated pixel beam. Note that in our invention "writing" on the retina is really rewriting (constant updating or exposing) of fixed pixels in fixed positions each by dedicated, static pixel beams and not by spatial rastering of a shared beam. A 2D, physical source display preferably still is employed, however this display can be very small, curvilinear or flat, and mounted close to the eye as upon a structure such as an eyeglass frame that is in the field of view. The inventive displayed image appears large and in focus despite the source display being physically so close to the eye. In order to achieve this, our multipixel source display, typically within the user's field of view and near the eye, has the emanating light from each of its pixels independently and substantially simultaneously directed to its respective intended retinal image location along dedicated raytrace paths. By "substantially simultaneous" we mean truly simultaneously or with delays between pixel exposures that are so short within an image frame (nanoseconds, for example) that the user senses no delays, yet the delays are long enough (not zero) to prevent adjacent-pixel diffractive interference if monochromatic light is involved.

We provide the following definitions to assure that our meanings are clear herein.

Definitions

1) Multiple-pixel-beam retinal display or MPBRD:

A multiple-pixel-beam retinal display (MPBRD) is a near-eye (or on-eye) display system in which an image source display has its image beamed into a user's eye in the form of a simultaneous bundle of spatially independent, nonmoving pixel beams, one pixel beam emanating from each source-display pixel. The pixel beams are each low-divergence, small-diameter beams such that they each follow a unique spatial path from their source-display pixel at least to the vicinity of the display exit pupil. In this manner, and unlike conventional 2D images being passed through convoluting and deconvoluting lenses, any lenses utilized pass only the separate pixel beams. Thus, the light coming from each source-display pixel is passed separately along independent spatial paths to the region of the user's eye entrance pupil. What the MPBRD has in common with VRDs (virtual retinal displays) is the use of pixel-wise beams steered to retinal targets, but millions as opposed to one and static as opposed to scanning. What the MPBRD has in common with HUDs is the use of a 2D source display but without the bulky conventional image-relay optics train. The MPBRD allows a high-resolution, video-capable source display to be placed very close to the eye (e.g., 0-25 mm) yet appear at an apparent perceived comfortable distance of under a meter to infinity while avoiding bulky and expensive lens trains. Special measures must be taken to assure that the light from each of the source-display pixels is passed individually to the vicinity of the eye's entrance pupil as spatially unique—yet simultaneous—pixel beams. These measures are associated with forming low-divergence pixel beams and then steering each one at the proper, unique, fixed angles and offsets to its dedicated, fixed retinal target. Typically, the MPBRD will have its numerous simultaneous beams (versus sequential scanned beam in the VRD) diverge inside the eye to expose an image on the retina which is significantly larger than the eye's pupil diameter. In addition, and also unlike a VRD, the MPBRD also is capable of delivering an approximately parallel or somewhat divergent beam bundle(s) into the eye in cases wherein a smaller image(s) on the retina is sufficient and is the design goal.

MPBRD(s) may be worn on one eye or on two eyes. Two-eye systems can present 3D as well as 2D image content such as by using known eye shutters or polarizers to achieve perceived stereo imagery.

The MPBRD display also may have connectivities to complementary external devices and services in addition to its own internal connectivities to, for instance, sensors, cameras, displays, data, CPU, GPU, power and memory. The MPBRD itself likely will include forward-looking video cameras, smartphone functionality, audio in/out support, GPS, magnetic compass, eye-gaze-determination, inertial and/or head-orientation sensors, and also may include interfaces to wired and wireless networks or external hardware connections such that an overall communication and awareness system is provided, and that system and its user can talk to or communicate with other devices, data sources or persons.

2) Static or angularly fixed pixel beams:

For MPBRDs, static or angularly fixed pixel beams can refer to any one of the following:

a) static or fixed relative to other pixel beams in the bundle long enough for one image frame to be presented,
 b) static or fixed relative to other pixel beams in the bundle for a period long enough for several image frames to be presented, or
 c) static or fixed until an overall image-format change is made, such as a retinal image-size change, retinal image position or retinal image resolution change, after which the pixel beams are again static and fixed.

3) Optical-coupler element: (typically employed as a standalone element or co-integrated into an emitting source-display pixel)

An optical-coupler element at least gathers the emanating light coming from a source-display pixel, typically into a smaller divergence beam. If the display pixel already has a small divergence beam, then use of a separate coupler may be avoided. A primary goal of a coupler is to prevent the waste of pixel-output emissive energy by catching as much of it as possible. However, a portion of the pixel's emissive output power in the periphery of the beam may be excluded intentionally in order to pass onward a lower-divergence output.

4) Beam-divergence-limiting element: (typically employed as a standalone element or co-integrated into an emitting source-display pixel)

A beam-divergence-limiting element assures that the beam divergence of each coupled pixel beam is or becomes small enough (preferably a few arc minutes or less) such that the user discerns an overall retinal image with useful contrast despite closely bundled beams. A multihole, multifiber or multichannel collimator may both limit divergence of each pixel beam and usefully create or maintain an organized bundle of directed independent pixel beams such as a parallel, converging or diverging bundle of pixel beams, with each pixel beam having less than the maximum allowed angular divergence. A microlens array such as a GRIN lens array or shaped refractive or diffractive microlens array could provide the same divergence control and bundling in the same manner in a smaller space. The holes, fibers, light channels, light conduits or lenses may have any solid, liquid, gaseous or vacuum makeup or structure regardless of whether it is an integrated structure, such as a microcapillary hole array, or many individual structures, such as the microlenses of a microlens array. Use of reflective elements such as an array of shaped reflectors also is possible. A primary goal of the beam-divergence-limiting element is to establish sufficiently low-divergence pixel beams that each then can be steered to its individual retinal destination by a beam-directing element yet maintain their spatial contrast at the retina.

5) Beam-directing element: (typically employed as a standalone element or co-integrated into an emitting source-display pixel)

A Beam-directing element contributes to the directing of pixel beams. The primary beam directing element of the invention individually steers or directs pixel beams toward their respective different retinal spots. A secondary beam-directing element may be offered by the above beam-divergence limiting element such as if it also forms or directs a parallel bundle of low-divergence pixel beams each having a translational offset relative to its neighbor. The directing element typically may be, for example, any one or more of a lens, prism, mirror or optical conduit or arrays of these. By "individually steered" it is meant that the many low- or no-divergence, simultaneous pixel beams in the bundle are differently, statically directed to form a converging, parallel or diverging bundle of such pixel beams as they approach the display exit aperture and the eye entrance pupil, with at least some of the converging, parallel or diverging pixel-beam bundle passing through the overlaid user's eye-entrance pupil, the passing beam bundle, upon arrival at the retina, forming a retinal image of some or all of the source image.

6) Convolution/Deconvolution:

Conventional optical lenses pass entire images in a manner wherein at points between the source object being imaged and the destination focal plane, the millions of ray traces coming from the millions of object points cross paths. No good image can be obtained at these intermediate positions and this state is called convoluted. Only at the destination focal plane has the lens then also applied its deconvolution to reestablish the recognizable image. This action of the lens also is described by its transfer function. When a desktop display is viewed, the display image likewise is convoluted and then deconvoluted as it passes through the user's eye cornea and lens to the retina. The invention of the MPBRD avoids convolution and deconvolution as it forces the light from each source pixel to travel a dedicated pixel-beam path without mixing with or crossing other pixel-beam paths on the way to the vicinity of the user's eye pupil. It also allows easily for achieving an apparently infinite, or closer but comfortable, working distance, if that is desired, without use of a complex lens train.

7) Source Display: (typically employed as a 2D, multipixel, flat or curved display whose emitted light is produced by the pixels or whose pixels are lamp, LED or laser backlit and possibly backlight-switched at the pixel by a shutter. Even front-illuminated reflective pixels are possible.

The flat or curved multipixel source display creates the 2D source image which then is passed to the retina as a bundle of dedicated pixel beams. Before the beams reach the display exit pupil they preferably do not overlap or cross paths. The source display may be flat or curved and may utilize any known or future display technology including, for example, those based on emissive and/or backlit LCD, LED, laser, plasma, OLED (organic light emitting diode, also including PLED polymer light emitting diode and AMOLED active matrix organic light emitting diode), quantum dot and electron microemitter and cold or hot field-emission technologies. Of particular applicability to the invention are: (a) OLED displays because they are very bright, have superb color gamut, can be made readily in small sizes and can be curved easily in one or more directions. They also can be transmissive to allow viewing through the display and (b) surface laser or VSCEL type displays, which inherently have very high brightness, narrow beams in at least one direction, (c) laser-backlit or pulsed-LED backlit displays using SLMs or shutters to gate the emitted light, which may also be highly directed and (d) plasma display technology.

Of particular interest and applicability are displays having very small pixels such as those used in HD camcorders or SLR viewfinders. These can have pixels which measure as small as 5 to 30 microns in maximum dimension. Included herein as well are displays which have pixel-by-pixel dedicated color filters as well as displays without any pixel filters, which instead use multicolor-laser, backside illumination of all pixels and an overlying spatial light modulator (SLM) to activate pixels. Future source displays probably will include quantum dot displays, an area of active research today. Even very low-profile CRT and laser-based, scanned-source displays are possible and have been proven for full-size and proportionally very thin televisions. The common trait of all possible source displays is low profile, i.e., the source-display thickness is small compared to its lateral viewing dimension. Typically, the source display will be available as a module, will be separately testable, and will have its own internal interconnections, switching and shift registers for activating pixels as do known 2D displays such as those used in TVs, cellular phones, smart phones, tablets and e-book readers. Even brightly lit e-paper-based book-reader-type displays could be used. We explicitly include source displays which have been specifically optimized for this invention as discussed herein. In some cases the source display will be cofabricated with or directly integrated during manufacture with one or more of the taught optical elements such as optical couplers or optical divergence limiters and directors. In particular, it is possible to cointegrate the source display and the divergence-limiting components, because divergence-limiting microcapillary or optical-conduit arrays have physical holes or defined cavities, respectively, which can be utilized as plasma or lasing chambers or have conduit refractive indices and dielectric constants which can support known light-emitting resonance behaviors.

8) Display Connectivity:

Wired, wireless and plug-in connections enabling connectivity to external entities such as standalone products, complementary products, display-supporting peripherals or display-supporting services, including, for instance, any type of: PCs, laptops, tablets, cellphones, smartphones, landline phones, music and/or video players, video or audio recorders, still or video cameras, GPS navigators, electronic mapping devices, disk drives, solid-state drives, dongles, plug-in memory cards or sticks, routers, servers, access points, vending machines, toll-taking kiosks, wired or wireless connections to external electronic devices such as via WiFi, USB, HDMI, VGA, RS232 or FireWire, network, optical links such as IrDA, radio-based connections, Bluetooth, satellite network or channel, cable TV network or channel, personal or employer security system. The purpose(s) of such connectivity could be many including inventive display uploads, display downloads, display user communication with other persons or with or via online services, display connection to the internet or directly to another person's device, or the use of an external television or smartphone to show live or recorded display images (surroundings and/or data images) or the use of a video recording device to externally save or broadcast a live or recorded data stream sourced from the display. Connectivities to automobile and vehicle electronics and networks also are anticipated. Such connectivities may be used occasionally or regularly, with or without the display user's live attention. We include external power connection when and if internal power is not used.

9) Display Services:

These are services which are free or paid for, voluntary or involuntary and which may or may not require an enabling connection from above or from a provider. Services may include such as: Internet connection service, cellular phone and/or cellular data service, satellite services, broadcast services, cable-based services, GPS services, search services, email or texting services, social network services, mapping and street view services, cloud-based services, data storage and/or backup services, data retrieval services (such as for display data overlays), advertising whether situational or not, subscription services, software or hardware licensing services, educational or instructive services, website creation or maintenance services, retail or vending services, travel services, gaming services, entertainment services, people/place finding and lookup services, dating services, navigation services, electronic wallet services, or any of speech/speaker/text recognition services

DETAILED DESCRIPTION

Figure 1:
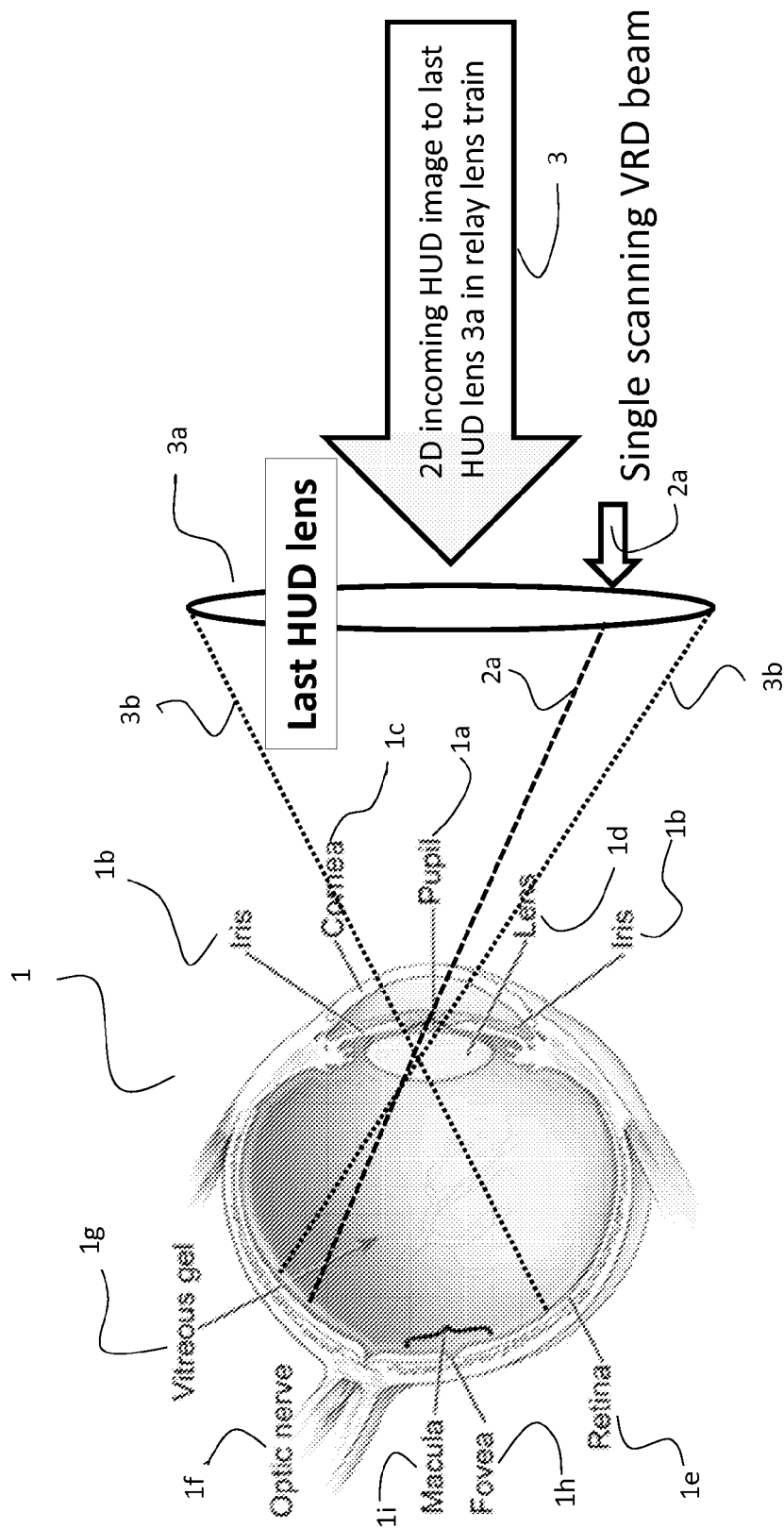
FIG. 1 is a schematic of the human eye and also depicts the fundamental difference between HUD-type image projection and pixel-wise VRD image-writing for near-eye displays.

In all embodiments of the invention, the light emanated from individual source-display pixels is individually piped toward its own dedicated spot on the retina along its own unique beam path before entry into the eye. All pixels are substantially simultaneously beamed in this manner by what we refer to as "pixel beams". By "substantially simultaneous" we mean, per the above, that any delays between the beams to avoid optical diffractive interference, if monochromatic light is employed, are so small as to be imperceptible to the user. Between the source display and the vicinity of the user's eye-entrance pupil the many individual pixel beams follow dedicated, nonconvoluted paths with minimal or no overlap and preferably no crossing of paths.

A typical inventive MPBRD will have the following physical stackup moving from the source display toward the user's eye:

a) a 2D flat or curved multipixel source display,
b) a coupling microlens array,
c) a beam divergence limiting microcapillary array, and
d) a shared directing lens or an unshared directing-lens array.

Moving toward the user's eye from the source display, the first layer, if needed, must couple the light from each source-display pixel along a path off of the display surface. Depending on the source-display technology, the angular emission of each pixel may be quite divergent, as is usual, for instance, to obtain wide viewing angles for TVs, etc. So, one either would use a conventional source display and apply optical couplers to each pixel in it or design the source display from scratch such that the output light from each pixel has reduced or very low divergence.

In most practical cases, coupling elements will be applied to pixels to gather the emission from most or all emission angles such that that most or all of the total emission from each such pixel can be redirected over a narrower, lower-divergence angle. Typical invention couplers, for example, would be a micro-lens array wherein each source-display pixel receives a tiny refractive, diffractive or combination coupling lens. Thus, if there are a million pixels, there would be a million sublenses in the lens array. Such a lens array likely would be formed directly upon the source display, as part of the integral source display, or laminated to the source display. Other pixel couplers, for example, could include the ends of optical fibers having appropriate acceptance numerical apertures (NAs), an array of GRIN (Gradient Refractive Index) lenses, or could be hollow capillaries (hollow channels/tube-shaped holes or microchannels) having internally reflective or refracting surfaces particularly at the pixel input end of the capillary. Note that a VSCEL or laser surface-emitting display or quantum dot display might have fairly good collimation in at least one direction. In those cases, one would employ less-strong couplers or no couplers at all, at least in that direction. If no extra couplers are applied then we define the coupling element herein to be an inherent part of the emitting pixel itself.

The second layer away from the source display, if needed, further narrows the divergence of each pixel beam after the above coupling. This would be particularly relevant if the coupler merely gathers light over an angular range but does not itself narrowly redirect that light into a sufficiently low-divergence pixel beam. In this case, a pixel-beam-divergence limiter will be employed. Typically, a high-aspect-ratio capillary hole or channel (long length to diameter) will be used, which mechanically forces the beam to become collimated. Very high length-to-diameter ratios of 100:1 or 300:1 or more can result in very small angular divergences of passing light. Such hole aspect ratios and superb straightness are possible using microcapillary technology that is available from vendors such as Incom of Charlton, Mass., and Schott of Germany. Further, microcapillary arrays have superb hole-to-hole parallelism, which is necessary in the preferred design. Arrays of fine, high-aspect-ratio holes can be made subtractively (fiber-optic-based microcapillary arrays from the above vendors) or via DRIE (directed reactive ion etching) plasma etching (custom made) or can be made additively such as by using X-Ray or deep-UV lithography (custom made). The making of high-aspect-ratio, thin-walled structures is widely known to be doable using X-ray or deep-UV lithography and thick photoresists. Such processes even can be applied multiple times to one structure to build up a collimator in height increments. In that manner, very high aspect ratios become practical with very thin walls, yielding more than 90% hole area in cross-section. The desired divergence limit of the pixel beams will depend on how close to the eye the display is and how closely the pixels are spaced. However, a typical desirable divergence will be measured in minutes of arc or less. Microcapillary holes used to control divergence can be made opaque to each other and of controlled or zero-reflectivity on their interiors as by film deposition(s) or micro-texturing therein. Such holes or channels may pass only ballistic light which never hits the walls or may include some low-angle wall reflective light if the overall divergence limit can be met. Further, inventors anticipate schemes wherein the portions of microcapillaries near the emitting pixel may include reemitting phosphors.

The third layer away from the source display always is required in the invention and it is to direct the now-narrow, dedicated pixel beams each to its own matching spot on the retina. This is accomplished typically with a shared refractive or diffractive lens or an unshared lens array wherein the individual pixel beams pass through the lens or lenslets separately within the lens(es), each being directed to its appropriate retinal spot by the macroscopic curvature(s) of the shared (or unshared) lens(es).

Another major point is that the pixel-beam directing function might be done by the same microcapillary-hole array or optical conduits that act to limit beam divergence. This would eliminate, or reduce the strength of the pixel beam-directing lens. However, this requires nonparallel holes in the microcapillary array in order to achieve the angular directing, which certainly is doable as described below but is somewhat more expensive to construct. That may also require pixel by pixel unique arrayed couplers which couple into different microcapillary angles.

MPBRDs may be mounted on one or both eyes, or a single MPBRD might be large enough to be visible with both eyes. Typically, there will be one (for one eye) or two (for two eyes and likely for stereo vision) MPBRDs. In the case of two MPBRDs on two eyes, 2D or 3D data may be presented in any known stereoscopic manner such as by utilizing LCD shutters or different polarizers for each MPBRD eye display. Audio output to the user and audio input from the user is anticipated. Inventors also anticipate that the MPBRD(s) may be mounted in/on eyeglass-like appliances and that those eyeglasses may indeed include corrective-vision lenses as prescribed by an optometrist, for example. Further, the MPBRD(s) may be mounted on either surface (near or far surface relative to the eye) of the corrective lens, on a dummy lens or at the edge of such a real or dummy lens. They alternatively may be mounted inside the eyeglass lens or fill a hole in an eyeglass lens (real or dummy lens) provided for them. MPBRD(s), such as OLED-based MPBRDs may be transparent, semitransparent or opaque. A transparent or semitransparent OLED could allow visualization of the user's surroundings as well as of the data along the same line of sight during either an OLED "on" or "off" state. An opaque OLED MPBRD could be used at the edge of a conventional eyeglass lens and not permit through-vision of the MPBRD itself. In any event, we anticipate numerous combinations of see-through and opaque MPBRDs as well as MPBRDs which become transparent when turned off. The MPBRD preferably will be provided to display video and/or static images or data in high or deep color but at least in monochrome or one broader-band mixed color.

Finally, we include in the invention any aspect of the MPBRD display and/or an eyeglass-like appliance it mounts on to require the expertise of an optician or optical specialist. We specifically include approaches wherein the MPBRD itself is a prescription item because some aspect of it could interfere with normal vision or because its optimal provision requires custom fitting of one or more lenses or inventive elements (corrective and/or MPBRD). A customary corrective-vision lens may or may not have pixel beams passing through it in a manner requiring a single line of vision which includes both MPBRD data and viewing of the real surroundings. We also specifically include the approach wherein a MPBRD can give a user an eye test, and that test information is used to order corrective lenses or a corrected or customized MPBRD display element or MPBRD system. Our taught optical elements typically will be of fixed optical design. However, we also include in the scope electronically adjustable elements such as electrofluidic lenses and recently demonstrated voltage-controlled LCD/photoresist lenses and lens arrays (Smith, P. J., et al., 2000, Variable-focus microlenses as a potential technology for endoscopy, In: Conchello, J. A. and Cogswell, C. J. and Wilson, T., (eds.), Three-dimensional and Multidimensional Microscopy: Image Acquisition Processing VII. (pp. 187-192), SPIE-INT Soc. Optical Engineering).

Inventors anticipate the MPBRD eye-appliance inventive display system to interface to various external connectivities and services in addition to the MPBRD's own internal hardware, software and interconnections. Internal capabilities may include smart cellphone functionality as well as look-ahead video cameras such that other persons, in addition to the user, can view what the MPBRD user is seeing, including his MPBRD data. Further, we anticipate the integration of GPS as well as other locational and navigational systems as well as a magnetic compass and inertial sensors for head motion/pointing detection. Many of those require onboard sensors, transmitters, receivers or transceivers, as is known. Further, we anticipate the provision of an onboard user's eye-pupil (and/or iris) tracking mechanism such as an infrared or visible-wavelength pupil and/or iris imager. These are useful for detecting gaze and eye-tracking in general. Finally, we anticipate the use of a variety of pointing devices including such as gesture-based, speech-directed, eye-controlled, body-motion controlled or finger controlled.

The MPBRD's preferred outward-looking video cameras, preferably two having eyelike lateral stereoscopic separation, could be used and MPBRD data preferably would be superimposed on real-world views or images in its correct relevant position, whether a 2D or 3D view or image is being seen through one or dual displays. For example, a person's name could be superimposed on the real view of that person or an advertisement could be superimposed on a real-world view of a related object or view of a store selling such objects or services.

Offboard computation, storage, access to software applications, search, communication or data processing, such as executed in the "Cloud" (remote servers providing free or fee- or subscription-based application functionality, data, computation, communication, user-to-user interaction, navigation or storage, for example) specifically are included, as the MPBRD's local computational power or storage may not always be sufficient for all purposes, and the MPBRD may require connection to data or wireless/cellular/mobile-connectivity networks as sources of data presented to the user or as part of an ongoing telecommunication with a remote individual or a database.

The MPBRD will, in many implementations, include an ancillary wearable support box or module, conveniently packaged off or on the head, which may include connectivity, services or basic utility items such as batteries or power sources or connectivity and services such as WiFi or cellphone or cellular data functionality, satellite links, television capability (network, cable, satellite) memory, RAM, non-volatile memory, graphics processors, CPUs, Ethernet or other network connectivity, Bluetooth connectivity, infrared (IRDA for example) connectivity, GPS capability, USB connectivity or FireWire connectivity, for example. Such connectivities may be wireless or wired and may be employed during normal, everyday MPBRD operation while worn or alternatively may be used when temporarily hardwiring or linking the MPBRD to a PC, cellphone, tablet or network such as to stream entertainment or to download/update MPBRD software. By wearable we mean wearable somewhere on the body, including but not limited to on a strap or clip to the waist, arm, or around the neck or in a pocket, pouch or holder. The support box or module would be connected to the eyeglass portion of the MPBRD wirelessly or in a cabled wired manner.

Also included are implementations wherein the optional support box or module is placed on/in an external object such as on a table or in or on a temporary or permanent part of a car such as the dashboard or a compartment or a stand. That external connectivity module could, for instance, alternatively comprise a separate product such as a personal computer, wearable computer, laptop, tablet, smartphone, media player, GPS mapper or gaming device. A broad range of external connectivity is desired and anticipated.

Let us turn our attention to FIG. 1 wherein we see a cross-sectional view of the human eye as mated to both a prior-art HUD-type image-projection display and to a retinal-scanning-type VRD display. In FIG. 1 we see, in section, a human eyeball 1. The human eye has an entry aperture for light called the pupil 1*a* with size adjustment via its surrounding shutter system or iris 1*b*. Outside of the pupil 1*a* is the outer surface of the eye, of which the cornea 1*c* does most of the focusing work for normal vision. Inside of the pupil 1*a* is the lens 1*d* which does a lesser amount of normal-vision focusing; however, it has an adjustable focus. The rearward interior surface of the eyeball is the photosensitive retina 1*e*. An optic nerve 1*f* carries detected light signals from retina 1*e* to the brain. The eyeball's interior behind the lens is filled with a clear gel called the vitreous gel 1*g*. The space between lens and cornea is filled with another clear liquid that is not marked.

In the case of a prior-art HUD display or head-up display, an incoming 2D HUD image 3 is shown entering leftwards into the last lens 3*a* of an image-relay lens train for projection into the eye as a 2D image as defined by dotted outer ray-trace lines 3*b*. The 2D projected HUD image is imaged upon the retina 1*e* in the region defined by multiple, dotted, light-propagation lines 3*b*. The entire image 3 is simultaneously transferred through the lenses such as final lens 3*a* and it is convoluted and deconvoluted as it passes through each such lens, including the eye's lens 1*d* and cornea 1*c*, in the known geometrical-optics convoluting and deconvoluting manner. In the case of the HUD image 3, the last HUD lens may be quite far from the eye (not shown) to provide an object distance of apparent infinity. In that case rays 3*b* arrive at the eye in a more parallel manner than depicted.

Staying with FIG. 1, in the very different case of a virtual retinal display, or VRD, we show a dashed line representing the single scanning VRG beam 2*a* which, instead of projecting an entire image at once, serially writes—via beam rastering (beam scanning)—adjacent pixel dots upon the retina 1*e*. A single such VRD scan beam is depicted as dashed beam line 2*a* to differentiate it from the HUD example. The VRD is shown writing just one pixel at a time of the two-dimensional VRD image. Note that the VRD has an exit pupil that essentially lays upon or overlays the user's eye pupil such that all the scanned beams 2*a* (shown at position 2*a* at that instant) from various steering angles make it through the user's eye pupil 1*a*.

Figure 2:
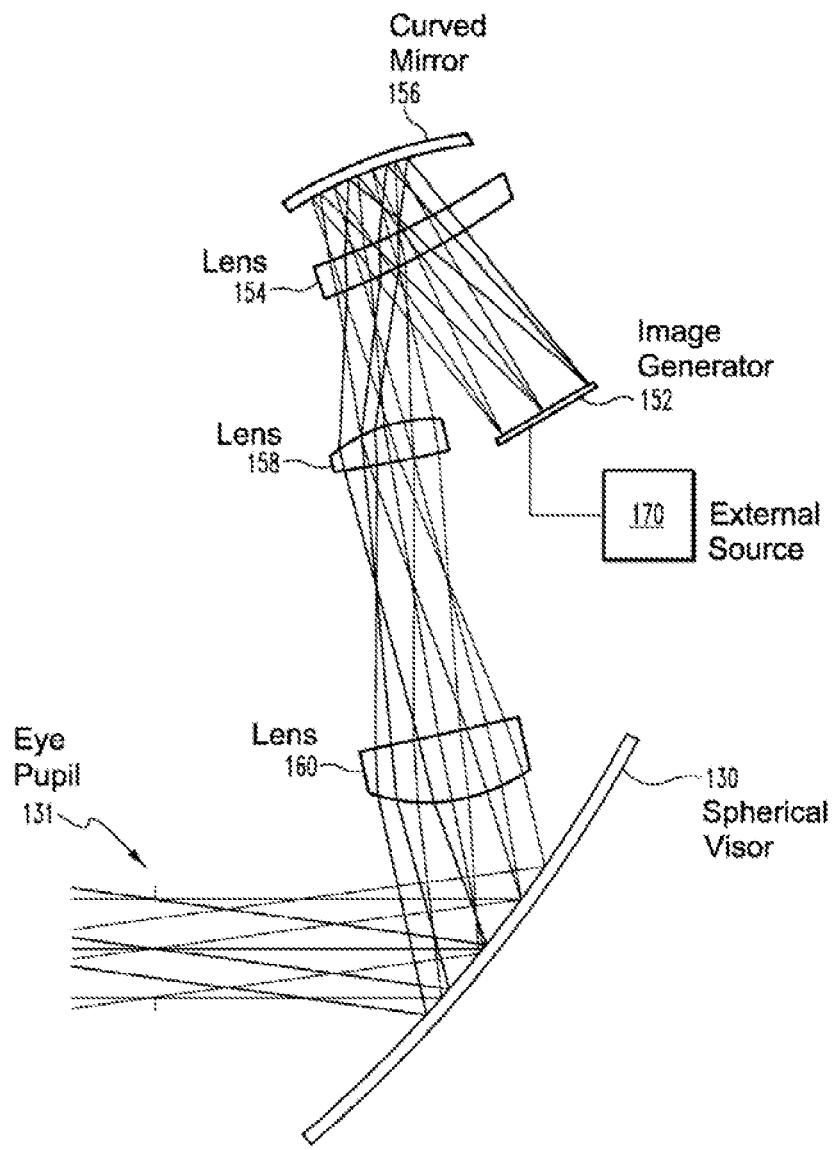
FIG. 2 schematically depicts a prior-art HUD or heads-up display coupled into a user's eye(s).

Moving now to FIG. 2, we show a drawing of a prior-art HUD "head-up display" from U.S. Pat. No. 7,791,809 B2 issued to Filipovich et al. Using his item numbers as shown from his patent drawing (Filipovich et al., FIG. 3) in our FIG. 2 we see, consistent with our comments above for our FIG. 1, a HUD system comprising a 2D image generator or source display 152 driven by an external electronic image source 170 which has its image projected upon a series of refractive lenses and reflecting/focusing mirrors 154, 156, 154 again, 158, 160, 130 and finally a reflective half-mirror visor 130 to the user's eye pupil 131. As mentioned above, such lens/mirror trains commonly are complex, expensive, fragile and can be heavy relative to a mounting structure such as eyeglass frames, headband, goggles or a helmet. The image arrives at the eye from apparent infinity distance with the help of the bulky complex lens/mirror train.

Figure 3:
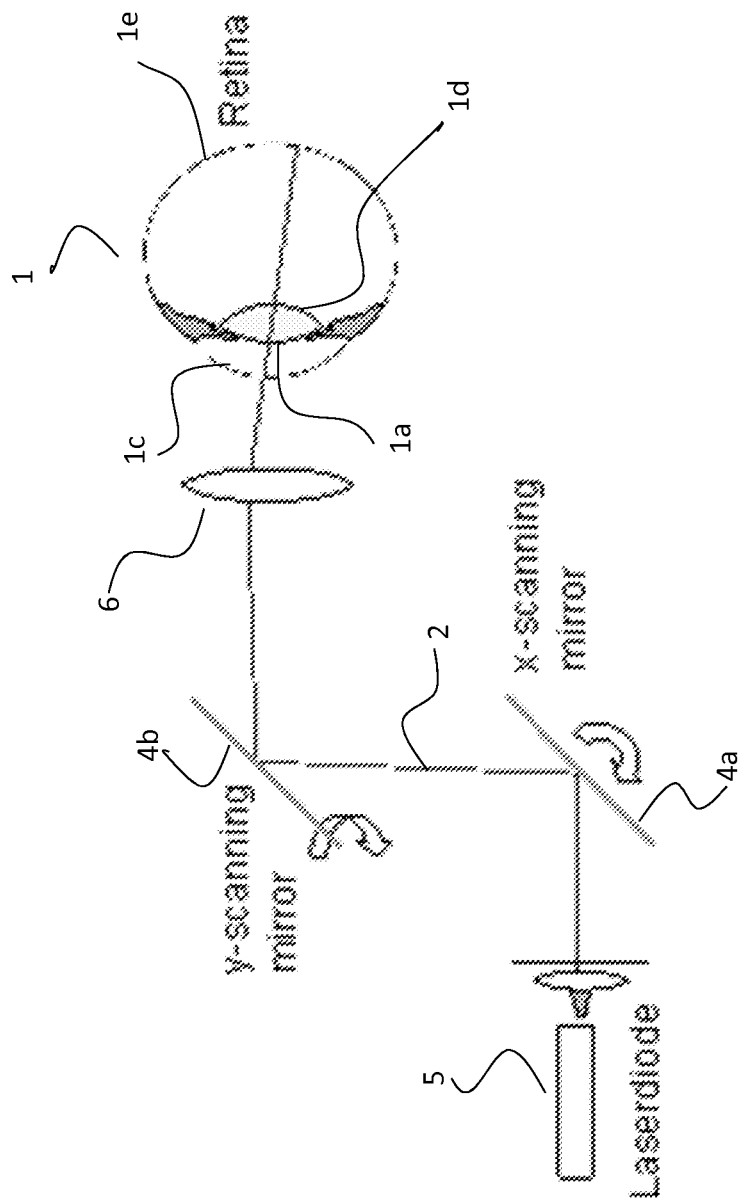
FIG. 3 schematically depicts a prior-art VRD or virtual-retinal display coupled into a user's eye(s).

Moving now to FIG. 3, we show a drawing of a prior-art virtual retinal display or VRD). The drawing for the figure is from Stutz et al., 2008, Visual Retinal Display III, Swiss Federal Institute of Technology Zurich, http://www.wearable.ethz.ch/education/sada/winter03_vrd3/index.

In FIG. 3, we again see the user's eye 1 having its lens 1*d*, cornea 1*c*, pupil 1*a* and retina 1*e*. The source image is scanned or written pixel by pixel by a laser 5 whose single beam 2 is doubly deflected by X-scanning and Y-scanning mirrors 4*a* and 4*b*. In some designs the steering mirrors are replaced by electro-optical (EO) scanners and in other designs the single laser diode 5 is replaced by three LEDs, red, green and blue, or lasers and a down-beam color-beam combiner. A refractive or diffractive objective condensing lens 6 focuses the steered beam through the eye's pupil 1*a* and upon the retina 1*e*. Note that in a VRD, the scanned beam 2, at any moment, takes a unique and collimated (minimally diverging) ray-trace path to the retina. Generally, such beams have divergence leaving the laser 5 of milliradians or minutes of arc, maximum. Note also that given the pixel-by-pixel writing, there is no conventional convolution/deconvolution taking place as there is only the single, moving, discrete, low-divergence beam passing through lens 6 at any moment.

In FIG., 4 we see a first schematic diagram of this invention, the MPBRD, or Beamed-pixel Retinal Display, in a first embodiment. Recall that we described that the MPBRD must (i) individually couple light from each pixel, and (ii) limit its divergence, and (iii) finally steer or direct the narrow beam from each such source-display pixel to the appropriate matching retinal target point. Looking at FIG. 4, we see the user's eyeball 1 on the left-hand side (LHS). We show a single eyeball for simplicity but dual-eye displays, including stereoscopic displays, are included and, given the inventive MPBRD, those familiar with dual-eye displays could design stereoscopic and 3D MPBRD displays.

Figure 4:
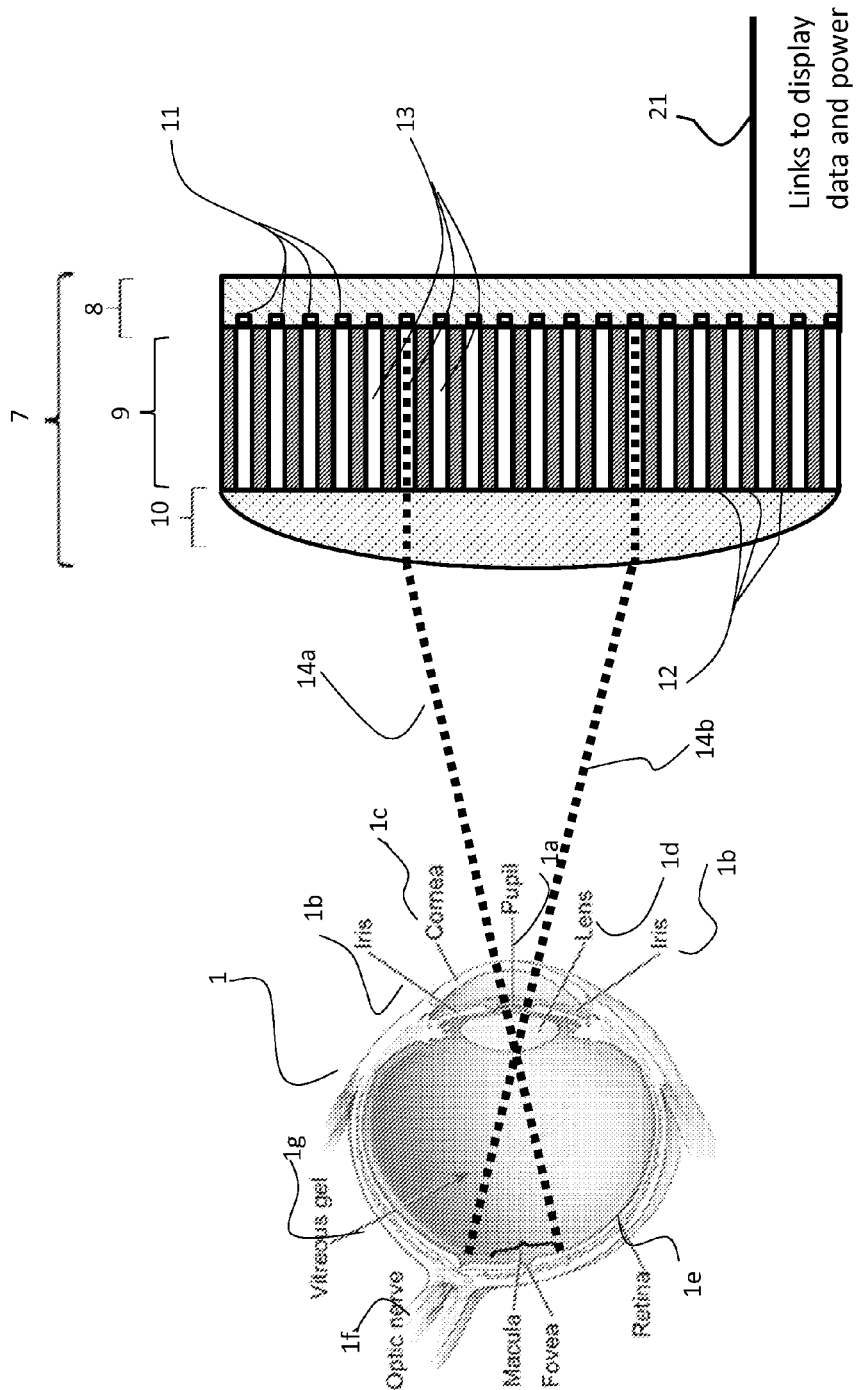
FIG. 4 schematically depicts the inventive MPBRD display in a first embodiment wherein each pixel's output is delivered to the display exit pupil as an independent optical beam.

Continuing with FIG. 4, we present a first embodiment of an inventive MPBRD Type 1 as item 7 on the right hand side (RHS) which is coupled into the user's eye 1. This Type 1 MPBRD item 7 comprises a source display 8 having an array of light emitting display pixels 11, an overlying collimator 9 having an array of unshared collimator holes 13 aligned or coupled to mating output display pixels 11, and on top of the collimator 9 a pixel-shared refractive (or diffractive) lens 10. For simplicity, we depict only two propagating pixel beams 14*a* and 14*b* emanating from their two respective source display pixels 11. If the source display 8 had a million pixels 11 the collimator typically also would have a million collimator holes and pixel beams (again, only two beams are depicted for simplicity). A link 21 to display power and displayed data also is shown. This may include wired or wireless links. Note that the collimator both reduces or limits individual pixel-beam divergence and simultaneously conveniently bundles or directs those beams into the smallest possible bundle while keeping them offset and independent. Such direction can be in the form of unique pixel-beam-by-pixel-beam angular direction and/or pixel beams having an offset from one another (such as offset parallel beams) such that they are still directed to different points in space.

In FIG. 4 MPBRD Type 1, the parallel-microhole, microchannel or microcapillary collimator 9 acts both to couple to mating pixels 11 and to collimate light beams from such pixels 11 until the light from each has achieved a very high degree of collimation and low divergence or nondivergence as measured in milliradians or minutes-of-arc divergence of its respective pixel beam. We interchangeably use the terms channel, hole and capillary to describe optical conduits which do not redirect light once it enters them; they mask light before its entry, the masking effect resulting in a more directed beam. This is different from optical conduits which actually guide and redirect light passing within them, such as known optical fibers having a core/cladding or known hollow conduits having a reflective or metal/dielectric-coated wall to act as a hollow waveguide. Both types of optical conduits, used alone or together, are applicable to the invention as long as our overall divergence limitation is met. Returning to FIG. 4, the collimator 9 here also directs the beams in parallel, albeit not in terms of individual angular steering, as will lens 10. The shared lens 10 then uniquely directs the pixel-beams 14a, 14b, etc. light from each such pixel 11 at the appropriate angles simultaneously through the user's eye entrance pupil 1a. Note that in this MPBRD Type 1 design the "directors" include a collimator 9 wherein collimation is done for all holes individually and in a parallel manner and the shared lens 10 which delivers the unique pixel-wise angulated steering or directing. Only lens 10 directs light to retinal destinations by angularly steering individual pixel beams differently. It will be appreciated that although lens 10 is "shared" it is unlike a conventional convoluting/deconvoluting whole-image lens because the light from each beamed pixel passes through only its own tiny area of lens 10 without mixing or convoluting with all the other pixel beams. It will be appreciated that if the collimator 9 has opaque walls between the collimator holes 13 and the holes have a high ratio of collimator hole length to diameter (l/d of, say, 200:1 or higher) then the collimator holes, if very long and narrow, can achieve low divergence equivalent to a conventional scanned laser VRD, i.e., minutes of arc. Although the average optical power passing through each hole 13 may be smaller than what the pixel 11 itself emits omnidirectionally (pixel cosine emission beam, for example), it must be remembered that the MPBRD is designed to deliver its numerous pixel beams 14a, 14b, etc. through the eye's pupil 1a. Because of that, the user's retina 1e will be staring at all the pixels 11 within the pupil's angle limits through the open pupil. As mentioned above, the internal reflectivity of any microcapillaries, regardless of whether they are gas or liquid filled for example, may be controlled as by depositing a low-reflectivity film on their interiors. Such films might include, for example, carbon-nanoparticle coatings (akin to soot) and/or might involve interior-surface nanotexturing. It is anticipated that major portions of the microcapillaries, especially toward the eye, will be rendered of very low reflectivity such as to assure low divergence of the exiting beams. Capillaries or portions thereof also may be provided in the form of hollow optical waveguides (as opposed to nonreflecting conduits which do not redirect any beams in their interiors), known in the optical arts and which typically have an air core and a metal or metal/dielectric thin-film interior coating, as long as the divergence limiting goal is met.

In order to avoid Airy-type diffraction rings at each observable pixel 11, we can assure that the collimator hole diameter is several times (e.g., 5 times or more) that of the wavelength of light which is passing therethrough. This would be a concern especially if the pixel light is substantially monochromatic (e.g., laser light sources) and therefore subject to self-interference. This also favorably reduces divergence of the exiting monochromatic beam. A prior-art scanned VRD needs a scanning beam about 0.1 million to 1 million times brighter than a conventional display pixel because it exposes retinal locations only for an exceedingly short time (nanoseconds) while at each retinal pixel location. With the MPBRD, each exposed pixel exposes the retina virtually 100% of the time so does not need to be anywhere near as bright, albeit we still could use rather bright OLED pixels, for example. This allows for reasonable MPBRD coupling and beam-directing losses, and also allows for design tolerances.

Further, the source display 8 purposely can be chosen to have at least one of higher light output or higher directivity than a typical computer-laptop or TV display. In the case of OLED displays, for example, they offer very high brightness without modification. Changes to OLED pixels to make them more directive, such as by the use of micro-optical elements, micro masks, shadow masks, GRIN lenses or micro-reflectors at—or even in—each such pixel, are anticipated. Finally, the optical-output aperture diameter of the MPBRD may be larger than that of the eye's entrance pupil 1a. In that case, rotation or tilting of the eyeball 1 will bring further regions of the MPBRD display output-aperture image into view while other regions drop out of sight, as long as the newly viewed collimator holes or directed pixel beam still point into the eye. We point out that prior-art VRD efforts toward having multiple display exit apertures involved replicating a single exit aperture and its content, not providing a larger field of view which is possible with the MPBRD because the MPBRD's source-image pixel beams do not all emanate from a single localized beam deflector as they do in a VRD.

Any or all of source display 8, microcapillary collimator 9 and lens 10 may be curved or include a curved interface(s). For example, to keep the working distance to the eye constant upon eye rotation or tilt, the display 8 could be curved and the collimator and lens adapted to its curvature by curving one or more of their surfaces. That also makes a sliding, or a continuous, elongated display-output aperture easier. Curving the display 8 makes sense particularly for larger displays 8 so that lens 10 does not then need to do as much steering from its edges, and the lens also can be thinner overall if it is refractive. Note that the collimator 9 offers an incoming image which appears at a distance of under a meter to infinity despite the fact that a conventional bulky lens train is not used. Even a very thin collimator 9 of a millimeter or so thickness, for example, could have a very high length/diameter (l/d) ratio for its holes and therefore very high collimation and very low divergence of each pixel beam. Note that—per our definition—we have essentially one pixel-beam per pixel. However, consistent with that definition and spirit, are the following useful variations:

1) A single source-display output pixel has separate red/green/blue output subpixels, and, if their total summed size is small enough, then the light from all three are coupled into a single collimator hole 13 which still meets the overall divergence-angle preference (e.g., a preferred 2 minutes or less of arc divergence).
2) The multicolor output pixel or one of its constituent primary-color subpixels is sufficiently large that a collimator hole 13 to couple it will not meet the preferred divergence-angle limit so, in that case, the pixel or subpixel gets two or more adjacent collimator holes 13 wherein each such hole 13 does meet the divergence criteria. In that case, one pixel might have three adjacent or nearby collimator holes (red, blue, green for example) coupling to its three differently colored portions.

It will be obvious now to the reader that lens 10 could be of a refractive type (shown) or diffractive type, Fresnel type, or even a combination or holographic type and that the lens 10 can be shared (as shown) or provided as a microlens array (not shown). A microlens array in particular can minimize further divergence, and divergence can be even further reduced by the array with slight array-lenslet focusing.

Further, there are numerous ways to make a collimator or divergence limiter 9, and two approaches which we specifically include as examples are:

(a) a faceplate of fused, bundled optical fibers, a microcapillary array (essentially a faceplate with the optical-fiber cores etched out, leaving microcapillary holes), a faceplate with the fiber cores etched out for at least some of their lengths (combined microcapillary and faceplate in one element), or an array of standalone optical fibers, including core-plus-cladding solid-glass fibers and internally coated or uncoated hollow waveguides), and (b) lithography-based approaches combined with additive or subtractive plating, etching or deposition of the preferably opaque walls defining collimator 9 holes 13. The ideal collimator would have very thin, opaque walls (microns range or less) and square, rectangular or polygonal holes such that little or no active optical pixel area is covered by the collimator 9 hole walls defining the collimator holes 13. Of course, one may choose to design the source display 8 such that its pixels 11 are farther apart than if the display was being used in a conventional direct-view TV or laptop manner. The reason for this could be, for example, to allow more room for the collimator 9 walls or to route additional source-display 8 interconnections between pixels 11 so that, for example, pixels could be addressed in manners which reduce potential nearest-neighbor diffraction effects such as by not firing any adjacent pixels truly simultaneously but instead firing adjacent pixels with a small time delay that is imperceptible to the eye. To some degree, retinal written pixels can be bloomed-out or made larger using higher pixel-emission power or longer exposures to fill any gaps between them but within the limits of avoiding multibeam diffraction and not decreasing resolution perceptibly.

Directing lens 10 (or even collimator 9) in FIG. 4 may even be prescribed by an optician or eye professional such that the user's view of the MPBRD 7 also benefits from known vision-correction measures (near-sightedness, far-sightedness, astigmatism, etc.). The lens 10 might be provided as by having the normal eyeglass corrective lens (or a modified version of it) also serve the beam-steering purpose in the MPBRD field of view, i.e., the MPBRD is the opposite side of the corrective lens in that case.

Before proceeding to the next figure, we mention that a given pixel beam for a given MPBRD design may have a number of possible crossbeam intensity profiles and cross-sectional shapes. These obviously include known beam profiles such as Gaussian, polynomial or pseudo-flat-top beams. However, we also intentionally include lateral cross-sectional beam shapes such as square, polygonal or even toroidal beams with a hole in the middle.

Figure 5:
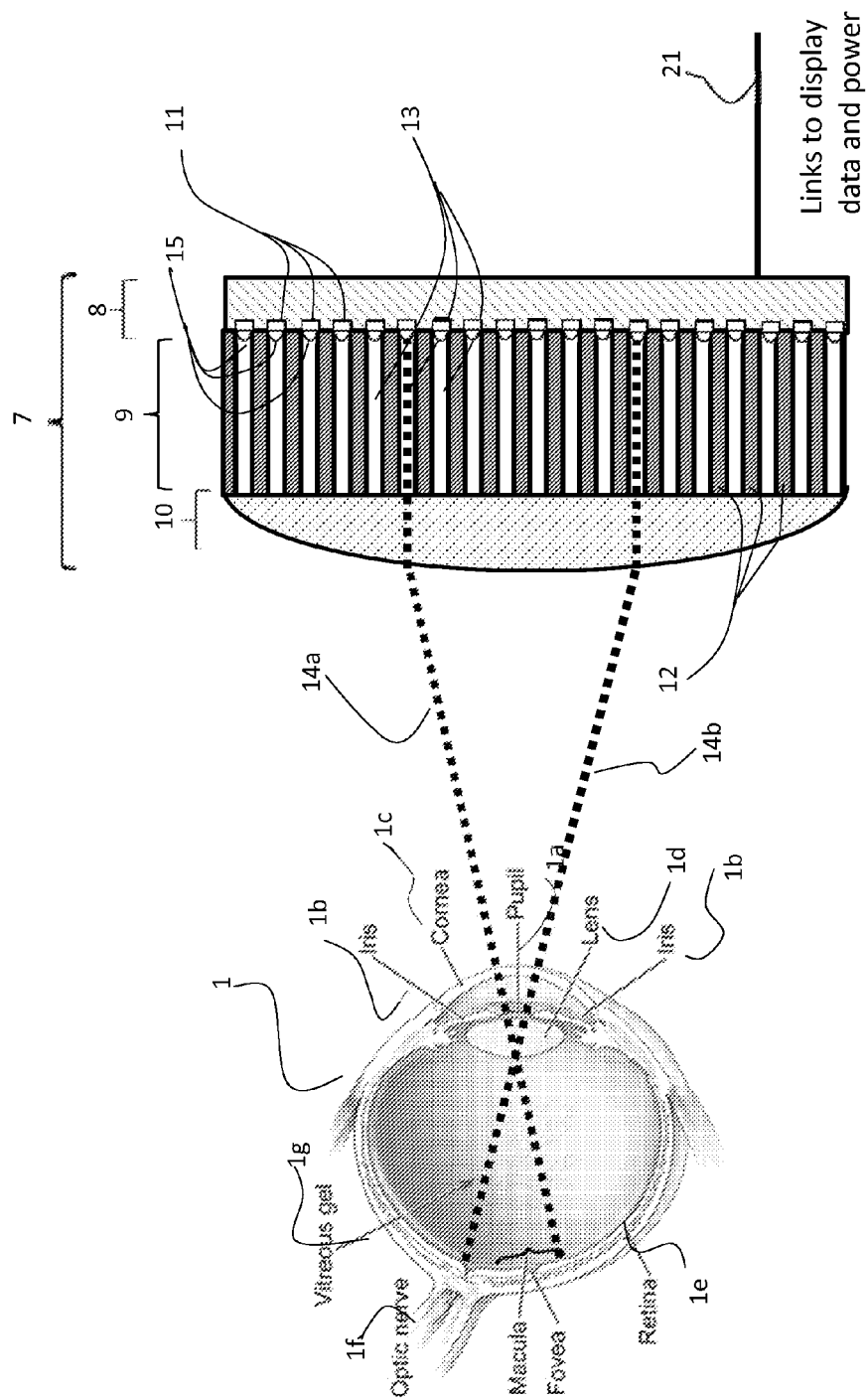
FIG. 5 schematically depicts the inventive MPBRD display in a second embodiment wherein each pixel's output is delivered to the display exit pupil as an independent optical beam.

Moving now to FIG. 5 MPBRD Type 2, we depict an inventive display similar to that from FIG. 4 MPBRD Type 1 to which is added improved optical coupling of the display pixels 11 into the collimator 9 via added optical couplers 15, such as by doing one or more of the following, for example:

a) (shown) Placing microlens array couplers 15 at the interface between source display 8 pixels 11 and microchannel collimator 9 to gather pixel emissive outputs more centrally into their juxtaposed capillary holes or channels 13. Such coupling microlenses 15 could be spherically based, for example, aspherically based (shown), cylindrical pairs, refractive, diffractive or GRIN (gradient refractive index) lenses.

b) (not shown) Rendering at least the near-pixel region of the interior collimator holes or channels 13 reflective but not reflective all the way out to the collimator 9 lens 10 interface, as being reflective the entire length would increase beam divergences at the hole 13 exit into lens 10. This can capture somewhat more light at the pixel 11 ends of holes 13 than if the capillary holes 13 are totally nonreflecting near the pixels 11. We say here "reflective" to more broadly mean that the inner surface is treated to actively guide light that enters the optical conduit as by reflection, refraction or diffraction.

c) (not shown) Having the collimator and divergence limiter 9 be a microcapillary array (fiber-optic faceplate with optical-fiber cores etched out) wherein the capillary holes 13 still have unetched optical fiber portions at their pixel 11 ends but wherein the fiber cores are etched away on the lens 10 side or end of the holes 13. This provides coupling of individual pixels 11 directly into optical fibers of a numerical index (NA) such that more light is captured from the pixels 11; however, one still has etched-out capillary holes with no fiber cores toward the lens 10 side for masking-based mechanical directivity improvement. This improves coupling and retains physical collimation via physical holes 13.

d) (not shown) Using highly directionally emitting pixels 11 such as surface-emanating vertical-cavity laser arrays or quantum-dot or quantum-dot-array pixels wherein their beams are directed substantially down their respective capillary-hole 13 axis (if collimator 9 is still needed) even without adding couplers 15.

It should be apparent, as mentioned previously, that lens 10 alternatively could comprise a microlens array similar to array 15 wherein each such microlens 15' (not shown) in that case individually could uniquely steer its own pixel beam to the correct retinal image spot as well as optionally contribute to further divergence control or reduction. Diffractive or refractive lens arrays 15' (not shown) would do this nicely and in a compact, thin and lightweight manner as compared to depicted bulkier shared lens 10. In this steering or directing application of microlens arrays, each such microlens directs the beam slightly differently and preferably maintains or further reduces pixel-beam divergence.

Figure 6:
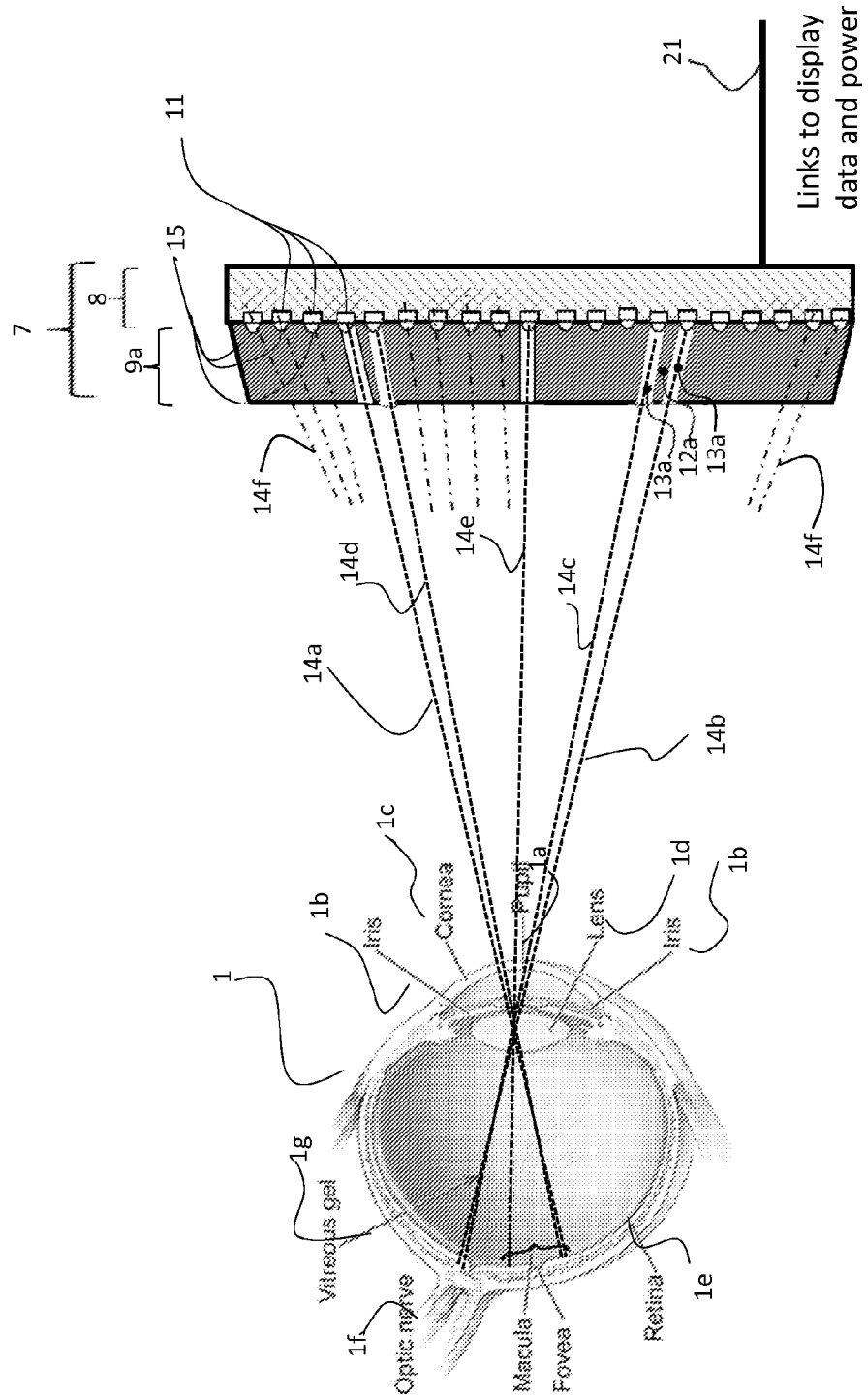
FIG. 6 schematically depicts the inventive MPBRD display in a third embodiment wherein each pixel's output is delivered to the display exit pupil as an independent optical beam.

Now, moving to FIG. 6, we see MPBRD Type 3. What is new in FIG. 6 MPBRD Type 3 is that, instead of a lens or lens array 10 on the eye side of a collimator 9 (as in FIGS. 4 and 5) made available to do pixel-beam directing or steering, we direct or steer each now-nonparallel collimator hole 13a toward its intended retinal pixel spot. In this manner, collimator 9a itself does the pixel-beam steering as well as providing a pixel-beam divergence-reducing or limiting function. Note that the pixel beams no longer are parallel but now are focally collimated within divergence-limiter and steering item 9a. Obviously, this means that the item 9a walls 12a in FIG. 6 might be of variable thickness but certainly are oriented at varying angles. To prevent confusion in FIG. 6, we only fully depict five (of up to a million or more) pixel beams 14a, 14b, 14c, 14d, 14e emanating from individually directed holes of the type 13a. Some of the remaining pixel beams and associated divergence-limiting steering holes 13a are depicted merely with partial centerlines. Display pixels 11 (in the drawing plane) are depicted as are the optional microlens array couplers 15. In this case, lens-array coupler 15 could be an array of diffractive, refractive or Fresnel lenses, for example, wherein each is centrally directing its pixel beam to its own retinal pixel location along its uniquely tilted collimator hole 13a direction. When a coupler 15 is employed, it most commonly will reduce divergence from very high values to intermediate values (e.g., from 60 degrees to 15 degrees). However, as in this example, it may or may not also contribute to directing or steering a pixel beam either more centrally into a collimator 9/9a hole or even directly to a retinal target without any lens 10 or collimator 9 being used at all. In the simplest possible inventive system (not shown) one has a source display 8 wherein each pixel is arranged to emit its own pixel beam to its desired unique retinal target. Each such pixel might have an integrated microlens, microprism, micromirror or directing/directable MEMs mounting to do this, such as a lens array cofabricated during the display-fabrication process.

It will be appreciated that the required narrow divergence of our individual pixel beams (less than a few arc-minutes divergence preferred) can come about as by one or more of a) the use of collimator 9 holes of high aspect ratio or a GRIN lens array, b) the use of refractive or diffractive coupling or directing lenses or lens arrays 15 or 10, c) the use of narrowly emitting pixel sources such as VSCELs and LEDs 11 and d)

combinations thereof. It is not our intent to reiterate the many known ways of forming or maintaining low-divergence beams. It is our intent to teach the approach of massively parallel, independent, static pixel beams delivering an image while avoiding conventional convolution/deconvolution and thereby avoiding large lens trains to depict images at user-perceived comfortable distances, which are widely accepted to be under a meter to infinity. In particular, we anticipate that combinations of micro-optical conduits (e.g., microcapillaries with nonreflective interiors) and individual lenslets or a lens array being used together to control pixel-beam divergence without excessively reducing optical power from the source pixel involved. An interesting voltage-controlled LCD/photoresist-based lens array applicable to the task is disclosed by Smith et al. (2000).

Figure 7:
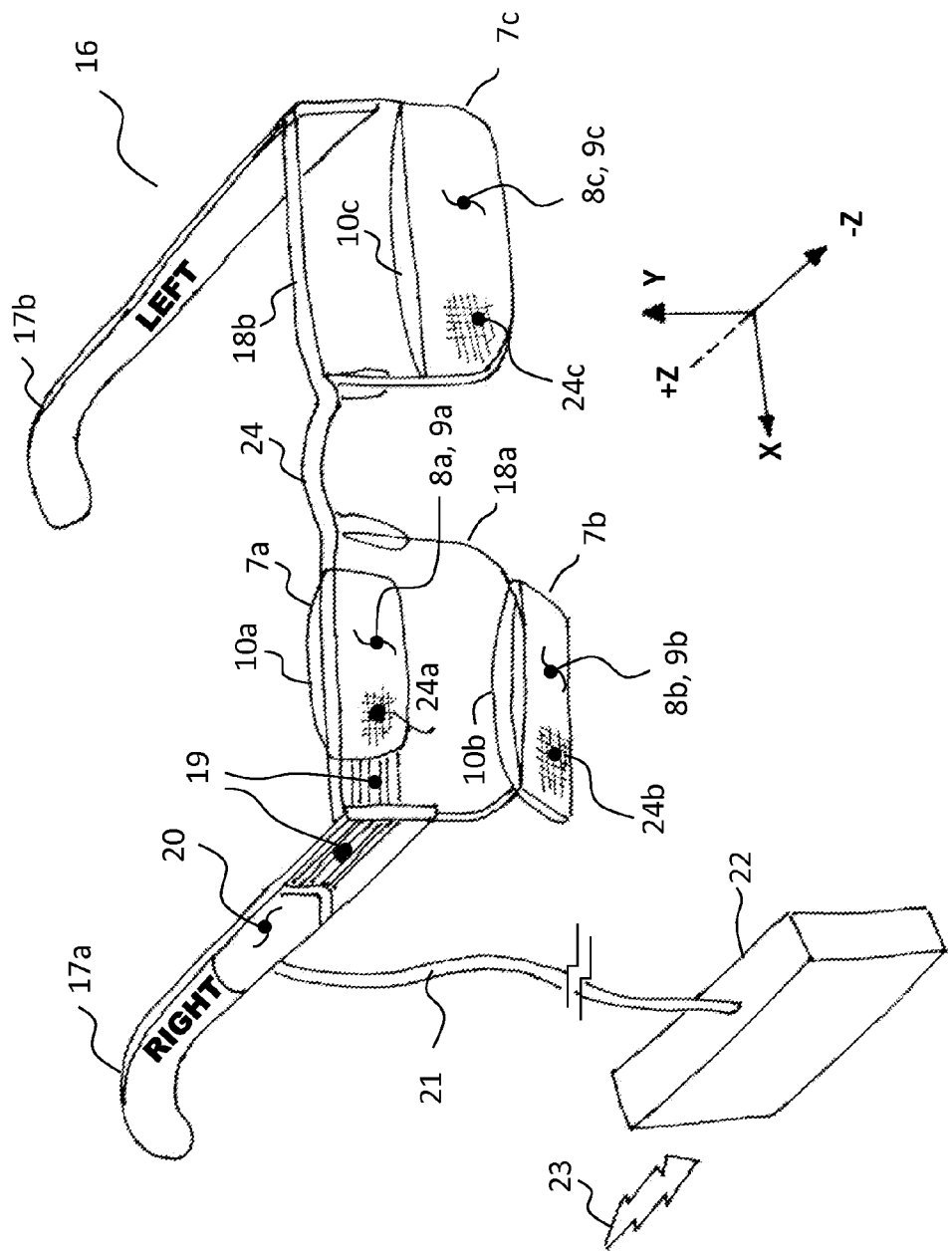
FIG. 7 depicts an eyeglass implementation showing 3 of several possible locations for the inventive display, 7a, 7b or 7c.

Moving now to FIG. 7, we depict a pair of eyeglasses 16 having a corrective lens 18a for the user's right eye and a corrective lens 18b for the user's left eye. Eyeglass frame side members 17a and 17b are shown for mating with the user's head and/or ears. The eyeglasses 16 are shown having inventive MPBRD displays 7a, 7b and 7c at three of several possible candidate positions. We note that the "eyeglasses" 16 do not necessarily have to be prescription-corrective for normal vision or for MPBRD viewing and could even be a fake or dummy eyewear appliance. Eyeglasses 16 could have non-correcting dummy lenses or even no lenses or could be sunglasses, goggles, a hat, a headband or helmet, for example. The only requirement is that the support for the MPBRD must be able to maintain the location(s) of the display(s) exit pupil relative to the user's eye(s)-entrance pupil. For a display exit aperture that is much larger than the eye pupil, this is easy to accomplish. Further, the user may wear one or two or more MPBRD displays on one or two eyes, possibly having stereoscopic or 3D viewing capability. A monocle MPBRD might alternatively be used. It is not a focus of the invention to teach the numerous known and future acceptable manners in which a small display (or a pair of displays) 7a, 7b, 7c can be held physically near or on the eye. The MPBRD, which is very simple and compact, can be placed close to the eye or even on the eye in the form of a contact-lens device, if desired, yet still offer imagery at one or more apparent working distance of less than a meter up to infinity.

Inventive MPBRD display 7a comprising, for example, per the prior figures, a flat OLED pixelated source display 8a, an overlying collimator/divergence limiter and coupler 9a and a further overlying refractive shared directing lens 10a is shown mounted on or in the upper rim portion of the right eyeglass lens 18a. Its exit pupil likely would be directed somewhat downward toward the user's eye pupil.

In a second option, an inventive MPBRD display 7b comprising, for example, a flat or curved OLED display 8b, an overlying collimator/divergence limiter and coupler 9b and a further overlying shared refracting directing lens 10b is shown mounted on the lower edge of the user's right eyeglass lens 18a and may tilt and/or slide to aim toward the user's right eye entrance pupil (user's eyes not shown).

In a third option, an inventive MPBRD display 7c comprising a flat or curved OLED display 8c, an overlying collimator/divergence limiter and coupler 9c and a further overlying shared refracting directing lens 10c is shown mounted in the lower region of the user's left eyeglass lens 18b. Thereat it may replace a portion of the eyeglass lens 18b or may be mounted such that the eyeglass lens 18b also acts as (or contributes to) the directing lens 10 function. Display 7c may have an exit pupil directed upward toward the user's eye entrance pupil.

In FIG. 7 we depict the array of pixels in the source displays as 24a, 24b and 24c phantom grid lines, respectively. These pixel outputs would be visible from the user's eyes. We note that any of the MPBRD displays 7a, 7b or 7c could be opaque wherein only the MPBRD image is seen via the MPBRD, or could be semitransparent wherein the MPBRD image is seen superimposed upon the user's actual surroundings. In an alternative approach, the MPBRD image, if inactivated, might allow the full surrounding image of the user's environment to be visible (transparent MPBRD only in MPBRD "off" state). The three example candidate MPBRD placement options shown in FIG. 7 each allow for at least some unimpeded viewing of the user's surroundings through the normal corrective lenses 18a and 18b (if vision correction is desired). Corrective lenses may be used in FIG. 7 to any one or more of correct the user's vision for viewing the user's surroundings and/or for viewing the MBPRDs. Lenses such as MPBRD lenses 10a, 10b and 10c and/or lenses 18a and 18b may correct a view of the surroundings and/or of one or more MBPRDs. By "corrective" we also include possible magnification, diminution of the size of or distortion reduction of an apparent MPBRD image. Either or both corrections might also be provided as by a collimator 9a of FIG. 7.

Examples of flexible or inflexible electrical or optical interconnections 19 are depicted connecting to MPBRD 7a in FIG. 7. These connections might include indium tin oxide (ITO) or other transparent electrodes 19 as patterned or deposited on or in corrective lens 18a, for example, or might include fine-trace flexible circuitry or fine cables routed upon or adjacent to a lens 18a surface. Optical interconnections may carry data or backlighting, for example. Electrical connections might include display power, backlight power or power or potential used to dim or close an electrochromic lens or an LCD shutter or to vary a voltage-controlled lens focus.

We depict on the user's eyeglasses 16 right side at waist level a previously mentioned separate, optional, external electronics display support box or module 22 connected by a cable 21 to a connecting junction 20 on the eyeglass frame right side arm 17a (shown) or on the left side arm 17b (not shown). When separate displays are provided for the left and right eyes, such as for stereoscopic or 3D viewing, optical and electrical interconnections may be routed conveniently along or through the bridge 24 of the eyeglasses.

As mentioned previously, the inventive display likely will have not only internal hardware, software and power (e.g., processor(s), memory, power source, receivers, transceiver(s), radios), but also connectivity to external devices, networks and services. Display-supporting box or module 22 specifically might contain, for example, display power sources, display data sources, recorded media for viewing/listening, networking circuitry or optics (e.g., Bluetooth, WiFi, IRDA), radio, TV, satellite communications, GPS, compass, navigation/orientation, antennas, smart or simple cellphone capabilities, cellular data capabilities, smartphone or PDA capabilities or audio/video recording capabilities. Support box or module 22 may be worn, carried or simply be nearby as it might be if it were on or integrated in the dashboard of a vehicle or furniture. Thus, wireless link 23 is depicted communicating to/from an outside source (not shown) to box 22. In other arrangements, a wireless connection (or wired connection) could communicate directly with the eyeglasses 16 and the eyeglasses could have a power source onboard (not shown). A MPBRD type 3 is not shown in FIG. 7 but also could or instead be employed. So, to emphasize, eyeglass MPBRD system 16 might be connected to a support box or module 22 during most or all of its use, and separately or simultaneously, the MPBRD inventive system as a whole might be wire or wirelessly connectable to an external electronics product or service such as any type of computer, cellphone, network or electronic dashboard in a car such that it can exchange data OR even gain access to utilities such as external power. Thus, the MPBRD system packaging may or may not include a wired or wireless support module but likely will include connectivity to standalone products and services. Applicants anticipate standard and/or proprietary interface specifications being created for interfacing boxes 22 to displays 16 and even separate vendors for each. The display user could carry or wear box 22 if the display system always requires it.

Support box 22 and/or a connected electronic product (not shown) might include wireless communications or, for example, a connector to attach/detach from a shown cable 21. In one embodiment, data for display by a MPBRD is delivered as a serial stream(s) of data which is multiplexed and then demultiplexed by onboard mux/demux chips within junction box 20.

The Importance of MPBRD Rigidity or, Alternatively, MPBRD Shape Correction

A very tractable engineering challenge to building the inventive MPBRD device is now described. It is readily apparent that any collimator/divergence limiter 9 and overlying directing lens/lens array 10 combination such as shown in FIGS. 4 and 5 must assure that the individual pixel beams such as 14a and 14b remain in their relatively fixed, closely spaced, yet non-overlapping positions. Thus, distortion of the MPBRD itself during use must be avoided. There are several ways that this can be accomplished, and we expound upon one method now. The most preferred method uses a rigid stiffening substrate to hold the lens 10 and collimator/divergence limiter 9 in an undistorted as-designed state, such as flat or in a fixed-designed curve. This stiffener can be, for example, a refractive lens 10 itself, as shown in FIGS. 4 and 5, or it can be a display 8 which itself incorporates a stiffener or silicon or glass substrate, for example (not shown in detail). It also may be or may include the collimator/divergence limiter 9 itself. A stiffener ideally has high bending stiffness so as to avoid a bending distortion of the MPBRD such that some pixel beams either excessively overlap at the retina or are spaced too widely at the retina. As always in this invention, the retinal pixel spots must be stably spaced from each other at center-to-center distances that assure that the user still discerns pixel-to-pixel contrast and a correct image. Obviously, that distance depends on the shape of the pixel beams upon arrival at the retina as well as their spacing. Preferred, but not required, are Gaussian-shaped beams which can be closely abutted because their beam edges have lower power, and minor overlap incurs tolerable pixel-to-pixel contrast reduction. Some edge beam overlap is tolerable to maintain adequate brightness and contrast.

Another preferred stiffener would be to use the corrective or noncorrective lenses 18a and 18b of FIG. 7 as stiffeners. Using this approach, either the front of the MPBRD (−z face facing out to the user's surroundings) or the back of the MPBRD (+z face facing the eye) is laminated or otherwise fixed to—and thereby forced to be coincident with a lens 18a or 18b surface. Within the inventive scope is having a lens-based stiffener which provides optical functionality for one or both of MPBRD images and surrounding images. Adhesive mounting of a MPBRD to (or within) an eyeglass lens, whether for hours or years, is within the inventive scope. That option might utilize transparent adhesives or a transparent insert bonded with adhesives or by fusing.

A second less preferred but doable method of avoiding mechanical-distortion effects is to allow them and to respon-sively correct for them. For example, an opaque MPBRD could be constructed on a bimetal substrate such that manipulation of its temperature bends the MPBRD in a correcting direction(s). Alternatively, one might utilize fluidic lenses or electrofluidic lenses (directing or coupling) which can adjust their shape or adjust their foci electrically. Another method would be to provide manual adjustment of curvature, such as via a small thumbscrew or setscrew or slider. Another would utilize a small, pressurized chamber of gas or liquid whose temperature change causes a correcting distortion. The user could control the degree of correction or an automatic sensor could do so. Again, it is most preferable to avoid distortions via the use of rigid stiffeners. Because we prefer the use of an onboard eye-pupil and/or iris monitor, such as an infrared or visible imager, we include in the scope the use of such a monitor also to measure image brightness and/or image contrast as presented to the eye, which would allow automatic adjustments to be made.

Included in the inventive scope is the use of optometrists/opticians, optical technicians and optometry services and tools to fit such displays upon real or dummy eyeglasses or other frame or to a user. This particularly makes sense where a corrective lens views both the user's environment and a MPBRD or wherein the MPBRD itself is provided using prescription data as it might be if a standard corrective lens 18a,b surface of FIG. 7 was to act as a co-laminated stiffener for a MPBRD. Finally, directing lenses 10a, 10b and 10c also could be custom fitted or selected to a patient for a given MPBRD design and gaze geometry. It is also possible that a person representing only the MPBRD maker(s) provide a technician who adapts a MPBRD to a preexisting pair of eyeglasses, particularly when the corrective eyeglasses correct only normal surrounding vision and not MPBRD images. Alternatively, an optician may cooperate with a MPBRD technician together representing both interests. A pair of prescriptive corrective eyeglasses sold with one or more prescription or off-the-shelf standard MPBRD(s) is within the scope.

We have not shown in the Figures features such as eye-tracking or pupil-tracking sensors. However, these may be employed to achieve gaze awareness, eyeball position or pupil state using known or future methods. Infrared tracking of the user's pupil/iris 1a size and/or orientation) is known using an infrared sensor array mounted on an eyeglass appliance. New methods certainly will become available as well. For example, provision of an interdigitated camera within a display chip for eye tracking has been demonstrated recently by the Fraunhofer Institute in Germany.

It also is possible that a MPBRD such as MPBRD 7a or 7b of FIG. 7 could be a clip-on device which is removable from the eyeglass frames or temple frames or other frame. In that case, the removable MPBRD probably should be self-rigid such that it is able to maintain its general shape independently. If removable, it alternatively might be flexible when not mounted to a rigid lens such as a lens 10 or lens 18a, b or cornea in the case of a contact lens MPBRD. An electrical or optical connector and mounting feature may be provided upon the eyeglass frame for when the MPBRD is used. A MPBRD that is removable also might be selectively mountable at different locations or orientations upon the head frame 16. The head frame 16 may include mechanical mounting features to accept the MPBRD in the correct alignment. Within the scope of the invention, is the provision of a standardized physical and/or electrical interface for one or more MPBRDs integrated upon commercially available eyeglasses or sunglasses, corrective or not.

Although we show MPBRDs as mounted on and in eyeglass-like or goggle frames we allow in the inventive scope for a MPBRD which is mounted on any type of head frame, such as for headphones and/or head-mounted microphones, or even on the eyeball(s) itself as in the general form of a contact lens held by wetting (tear) surface tension. In particular, MPBRD type 3 does not require any directing lens 10 and therefore type 3 could be shaped to an eyeball 1 cornea 1c such that each pixel beam 14a,b,c,d,e is directed to its correct retinal spot, provided that it has an optical path into the users eye pupil. In the case of wetted attachment to the eyeball, the cornea acts as the stiffener. Any inventive MPBRD using a low-profile directing lens or lens array 10 could be designed as curved and wetted to the eyeball cornea. This likely, although not necessarily, would utilize an optical prescription. In this case, collimator/divergence-limiter 9a of FIG. 6 would be arranged to have a smooth, wettable surface touching the cornea 1c. It can be argued that an eyeball-mounted MPBRD has reduced criticality of individual pixel beam directivity or divergence since the beam propagation distance is much smaller due to the MPBRD being even closer to the retina 1e. Note also that if the directing lens 10, if used, is a thin, curved, Fresnel, diffractive-lens array or a refractive-lens array, then other of the example MPBRDs also may be floated upon an eyeball as long as the MPBRDs are made in the appropriate curved form.

An eyeball-mounted MPBRD (not shown) might require only the source display 8 and an array of coupling and directing lenslets or a lens array 15. Diffractive Fresnel lenslets 15 would be particularly attractive since they are amenable to receiving a generally smooth overlayer coating to act as the interface to the eyeball 1. MPBRD power would be provided to the on-eye display such as by using RF coupling coils, photovoltaic power transfer or an umbilical wire(s) or microcable which is compatible with blinking.

We emphasize that any source display 8 of a MPBRD might have its light-emitting or light-passing pixels, emitters, LEDs, lasers or backlit shutters operated in any sequence including sequences not normally used when the source display is used in a conventional manner not near or on the eye, i.e., not line by line or column by column, as is common. In particular, we anticipate designs wherein adjacent pixels are not simultaneously activated such that near-neighbor diffractive interferences are avoided in cases wherein the pixel light is substantially monochromatic. We fully realize that to do this may require altered source-display pixel interconnection and switching schemes for the near-eye application. In particular, a multilayer interconnect scheme may be employed in source display 8 to provide switching that more closely approaches random pixel access. In such a scheme, many nonadjacent pixels may be activated simultaneously so as to maintain apparent brightness and frame rate. Even that approach could have many thousands of pixels illuminated at any given instant, very unlike a single-beam, swept-beam VRD that requires dynamic beam deflections.

Ideally, any collimator or divergence limiter 9 will have microholes or microconduits which are arranged on the same grid as the source display pixels (at least at their pixel ends) or will have such a dense array of microholes smaller than the pixel size that alignment of the two does not matter. A glass-based collimator/divergence limiter 9 using microchannel-plate technology typically will have 50-80% hole area and, in cases wherein the collimator is made using lithography techniques, the walls may be even thinner such that a hole area approaching 90%-95% is reached. A lithography-based additive or subtractive DRIE (directed reactively ion-etched) etched collimator made of electrodeposited or electroless nickel or gold also can have rectangular holes to match the rectangular pixel shape, the walls sitting on areas that are substantially between the emitting pixels. Since the MPBRD typically converges the pixel beams as a group for eye pupil entry, such convergence could be used to "fill in" any inter-pixel gaps, and the actual gaps could be put to practical use, such as for placing the pixel interconnections. This could be done by using a collimator/divergence limiter 9 wherein the beams are not exactly parallel but are very slightly converging relative to each other. Thus, the user sees only about 90% of the source-display surface area presuming the lost 10% lies between source-display pixels whereat source-display-pixel interconnections and electronics are situated, so no real loss of emissive power is associated with a minor insertion of pixel gap spaces. At the retina, the intrabeam gaps could even be closed or made smaller by such slight collimator convergence.

An additional variation would be wherein an interface between a directing lens 10 and the juxtaposed collimator/divergence limiter 9, coupler 15 or display 11 is curved (not shown). For example, a specific preferred design would have the director lens 10 with dual curved surfaces, both concave to the eye from the eye side, like many eyeglasses, but likely with a stronger lens. This provides a strong focusing effect yet keeps the lens thin and light in weight. This lens could be mounted to a concave collimator/divergence limiter wherein the collimator/divergence limiter 9 still has parallel holes or light conduits, yet is thinner in the middle than at the edges. Alternatively, the collimator/divergence limiter could instead be equally concave on both faces such that it is of uniform thickness and hole/conduit aspect ratio.

Other variations have the lens 10 being somewhat non-spherical, such as aspherical or a hyperboloid for reduced image distortion. Other director 10 (or even coupler 15) lenses could be compound lenses, lenses with antireflective coatings, color-corrective lenses, or lenses with electrochromic or photochromic tinting to adjust for ambient-light conditions such as sunlight. Lenses may include more than one lens material or lens material having gradated refractive indices. Lenses may be any one or more of refractive, diffractive, reflective (focusing-mirror based) or holographic. Lenses may be simple or compound lenses, whether fused or laminated to each other or not. Optical filters, prisms and/or polarizers also may be used anywhere in the display where they are useful.

Lenses for directing, and even for coupling may be fabricated from, for example, glass, doped glass, gradient-doped glass, crystalline materials, sapphire, suitably transparent or translucent semiconductor materials, silica, CVD diamond, fused silica, liquids (especially electrically deformable liquids or electrically alignable liquid-crystal molecules surrounding fixed-polymer lenslets) or optical-grade lens or fiber polymers, as is known, and additional materials may be added in the future. These lenses may be singlets, doublets, triplets, spherical, aspherical, hyperboloids, achromats, compound-curved, cylindrical, acylindrical, convex, concave, doubly convex, doubly concave, concave-convex, planoconvex, planoconcave, GRIN or gradient-index, drum, ball, half ball, Fresnel, lenticular, lens arrays, coated lenses (such as for antireflection, filtering or electrical conductivity). A prism, mirror or diffraction grating might be added such as to globally redirect a pixel-beam image bundle. Keep in mind that the many pixel beams in the bundle, although distinct and separate beams, may be converging or diverging gradually toward or away from one another depending on which side (outside or inside) of the user's eye entrance pupil is being discussed. In all cases, we have discernible contrast between neighboring pixels upon beam arrival at the retina.

The inventive MPBRD display preferably always will have at least these features:
a) Pixel-output light from a source display which is coupled to separately (or already separately emitted as beams), pixel by pixel.
b) The coupled independent pixel outputs individually being directed as pixel beams at least to the display exit pupil region.
c) The pixel beams arriving at the user's retina with pixel-to-pixel retinal center-to-center spacing, with or without overlap, such that the user discerns a global image having useful contrast.

It should be apparent that more resolution than the eye can discern can be provided by extremely close retinal pixels or the retinal pixels may be spaced far enough, center to center (with or without some overlap), such that the user actually can discern individual pixel-to-pixel contrast. In any case, we intend that the desired outcome is a discernible image on the retina regardless of whether the perceived resolution is at the one-pixel level or at the lesser multipixel level.

For (a) above, if the pixel already emits a somewhat collimated beam, e.g., surface-laser-based pixel, then additional couplers 15 may not be required and/or a weaker coupler may be employed. If those beams are emitted in a parallel fashion then one still needs a director 10, presuming a converging beam bundle is delivered to the display exit pupil. If each pixel laser beam is directed individually and also is of the preferred low divergence, then in an ideal case one could forgo director 10 (the directed laser pixels already steer the beams) and the collimator 9 (the beams are already of low divergence). In most actual cases, it is anticipated that a director independent of the display 8 will be required to steer the beams, such as a lens 10 or a combination coupler-and-director-microlens or microprism array 15. A director lens microarray 10 (not shown) is more compact than a single refractive lens 10 (shown) and also allows less beam divergence due to its much shorter propagation path and can reduce divergence further via focusing.

We stress that it may be possible to combine components. As an example, one could provide a source display 8 wherein individual pixels 11 are formed inside of microcapillary holes 13 so that their emissions are inherently well coupled optically to the microholes. For example, such pixels in the microholes could comprise tiny plasma-display pixel chambers or tiny electron emitters or optical microresonators. A microhole interior at the pixel end also could have a light-emitting phosphor coating. The backside of that combined display and collimator facing away from the eye could have a smooth surface layer and contain pixel interconnections.

Further, a future display technology may provide an array of surface-emitting, highly collimated beams, such as laser arrays or quantum-dot array beams, wherein beam steering is accomplished either by MEMs-type movable mirrors (beams are still stationary during retinal exposure of each image frame) or by having each such emitter incorporate a differently aimed, static lens or mirror at each pixel. One advantage of the movable MEMs-based approach is that between beam exposures (between image frames), e.g., in the brief time intervals between showing individual image frames comprised of all pixels at once, one could re-aim or resize the inventive display-system exit aperture or interbeam angles.

Much has been written about virtual reality (VR) and augmented reality (AR). The MP MPBRD BRD invention may be utilized for such VR and/or AR displays as it can be made in a see-through (superimposed images) or side-by-side (adjacent images) manner. Any desired eyeball, pupil and/or iris-size tracking mechanisms may be utilized to determine eye gaze and pupil geometry. In addition, external connectivity and services such as cellular network connection, WiFi connection, hardwire connector ports and internet services may be provided in addition to MPBRD-internal items such as GPS, clock, compass, inertial sensors and wireless navigation aids to determine gaze, location, time and observed subject matter.

We include in the scope of the construction of collimator and divergence-limiter 9 any structure which results in a collimator having an array of optical conduits for light to pass through. By "conduits" we again include both masking holes which do not actively guide therein, or internally guiding conduits such as core/clad fibers or hollow waveguides or combinations thereof.

To be absolutely clear on this point, the divergence-limiting element 9 may, for example, be a single structure such as a multihole microcapillary collimator or, alternatively, may, for example, be a microlens array (many structures formed simultaneously) wherein each pixel lens controls divergence of the emission for that pixel or a combination of both. What matters is that pixel-beam divergence is at least controlled at or below a maximum allowed value (a few arc minutes, for example) which permits discernible images to be created on the retina yet the available pixel light is preserved as best as possible.

Any of the taught optical elements may be combined with other taught elements to provide multipurpose elements. One example is a lens array which both couples and controls divergence. Another is a collimator which both limits divergence and steers beams. A third is a collimator whose conduits cointegrate emitting pixels, such as plasma or lasing pixels. Further, the director or director plus collimator conceivably could be mounted in a wetted contact lens while the source display is separately mounted on an eyeglass frame.

Further, measures to reduce optical crosstalk between such microcapillary holes or lenses, such as by using opaque wall materials or opaque coatings over glass walls, are within the scope.

We mentioned the possible issue of constructive diffraction among a large set of closely spaced pixel beams as viewed from the retina. The degree of this potential issue depends on the monochromicity of each primary color: the more monochromatic and the more spatially regular the beam grid is, the worse the potential for interference. The laser- and quantum-dot-array-based displays are probably the most monochromatic with the color-filter-based technologies somewhat less so. A few general strategies for combatting mutual diffraction in the incoming (to the retina) beam bundle between nearby pixel beams include:
a) Do not fire adjacent or perhaps even close-by beams of the same color simultaneously but do so with a slight dithering, or time delay (e.g., nanoseconds), that is imperceptible to the user. This might be carried out by randomized firing or alternate-row or column firing, but in all cases we desire to have numerous different static beams (e.g., hundreds or thousands) simultaneously impacting the retina to maintain overall brightness and frame rate.
b) Fire only different-color beams simultaneously for closely spaced pixel-beam pairs.
c) Slightly randomize the pixel-beam spatial grid (or source display pixels themselves) to damage the periodicity and constructive interference, but not so much that image degradation becomes detectable by the user. This will limit many-hole mutual diffraction.

d) Render the primary colors (or only the colors that are used) to have broader wavelength distributions such as with custom-designed filters on each pixel or slewing of a pixel drive current or voltage or the use of activating and secondarily emitting phosphors or fluorescent materials.
e) Use a broader-band, whitish backlight if a backlight is used.
f) Ultrasonically vibrate display elements such as the collimator 9, if a collimator is employed. Different optical conduits will dither their pointing angles with ultrasonic distortions in an out-of-phase manner.

In order to attain even higher apparent brightness, one might consider using a pulsed flashlamp, arclamp or discharge lamp, pulsed plasma pixel or even a high-power pulsed LED(s) or laser(s) for backlighting a source display in white or in specific colors for color-backlit for SLM shutter designs. Such pulsed light possibly could be delivered through a delivery fiber and spread with a diffuser of compact thickness or could be provided by a wide-area plasma discharge or microprism display backplane.

It may be useful for the MPBRD to present to the user (or to a friend of the user) an electronic (data) version of his/her actual surroundings as imaged by a MPBRD video camera(s). This may be in pseudo realtime, i.e., with imperceptible delay. In this manner, it is even conceivable that the MPBRD user sees only electronic data images with/without superimposed overlay data such that the user's entire visual experience is via electronic data imagery with no real unaided live view. If that were utilized, it is preferred that it can be switched off to again allow at least some unaided real-surroundings view.

It now will be apparent that the bundle of pixel beams likely will, in a manner similar to a one-beam VRD, have its many differently—and statically—directed beams simultaneously (as opposed to sequentially for a VRD) cross at a vertex overlaid at or near the users eye-entrance pupil, wherein by "differently and statically directed" is meant that the many low- or no-divergence, simultaneous pixel beams in the bundle form a converging, parallel or diverging bundle of such pixel beams as they approach the display exit aperture and eye entrance pupil, with at least some of the converging, parallel or diverging pixel-beam bundle passing through the overlaid user's eye entrance pupil, the passing beam bundle, upon arrival at the retina, forming a retinal image of some or all of the source image. We emphasize that "simultaneous" refers to at least one of: (i) at least some of the pixel beams are truly simultaneous, meaning they are propagating at the same time or (ii) at least some of the pixel beams have delays between them, but the delays are so small that they are imperceptible to the user.—This allows large apparent images to be exposed upon the retina despite the small, few-millimeter-sized iris. Note, however, that for a typical iris of 3 mm diameter, even a parallel bundle of pixel beams of 3 mm diameter or less could be projected upon the retina without any beam crossing at the entrance pupil, although this will result in a much smaller apparent image than the above diverging crossed bundle. So, for converging MPBRD beams approaching the eye, they would diverge inside the eye after crossing as for a VRD, except that the MPBRD can accomplish this for simultaneous beams. For parallel or roughly parallel beams entering the eye within the lateral confines of the eye pupil, they would land on the retina in an approximately parallel manner. Of course, the cornea and eye lens modify the bundle shape somewhat as it passes inward as well, and this is taken into account when the direction angles of the incoming beams are chosen during display design.

In conclusion, the reader will have noted that the invention requires that the divergence of individual pixel beams be limited. Inventors stress that this requirement may be met with beams being only slightly divergent, as discussed, or with beams being somewhat individually convergent wherein individually they converge all the way to the retina or even individually converge and then rediverge on the way to the retina. In all these cases, one can still obtain retinal pixel spots having the desired center-to-center spacing and obtain the apparent comfortable distance of the viewed subject matter.

The invention claimed is:

1. A multibeam near-eye or on-eye visual display system that simultaneously emits and directs all pixels of a multipixel physical source-image display to the retina, in focus on the retina at high image resolution and at high frame rates and with high image brightness, that eliminates the need for beam rasterization or beam-scanning components, and that is wearable by a user closely in front of or directly on one or both eyes wherein each of the emitting pixels places an optical beam unique to that pixel at a fixed position directly upon the retina simultaneously with all other imaqe pixels, along a total optical-path distance for each pixel that is closer to the eye than the user's normal near-focal-distance, each near-eye or on-eye display comprising:
   a) a physical image source in the form of an emissive, miniature, multipixel flat or curved display from which all image pixels simultaneously emit light toward the eye,
   b) a passive optical component that is affixed to the emitting surface of the physical source display, situated between the physical source display and the eye, the passive optical component comprising a dense array of hollow, high-aspect-ratio length-to-cross-section collimating light conduits in 1:1 positional correspondence with the pixels of the emissive display, said conduits reducing beam divergence such that all pixel beams from the source image are maintained as separate, illuminated pixel spots on the retina, thereby delivering the source-display image onto the retina with high image contrast,
   c) each light conduit optically isolating a pixel beam laterally from all other pixel beams,
   d) the optical-conduit layer providing beam steering by one of:
      a. the optical pixel-conduit collimator tubes being non-parallel and themselves providing beam steering by each conduit having a unique angle from the source-imaqe display to the retina, or
      b. the optical conduits being parallel, and all collimated pixel beams then pass through an affixed shared lens that steers all beams simultaneously to their correct, fixed positions on the retina or
      c. a combination of the conduits and a lens together steer the pixel beams,
   e) a head- or eye-worn appliance that holds the display spatially aligned with a user's eye entrance pupil, and
   f) a source of display power or a connection to a source of display power and
   g) a source of video or image content or a connection to a source of video or image content,
wherein the source image appears on the retina at high frame rate and brightness, the retinal image being comprised of a simultaneously beamed array of pixels each of which is independently, simultaneously and passively divergence reduced, independently, simultaneously and passively routed in lateral isolation to all other pixel beams, the brightness and frame rate being high because all image pixel beams operate simultaneously.

2. The multibeam near-eye or on-eye visual display system of claim 1 wherein the many low-divergence or nondiverging pixel beams, before their arrival at the display exit aperture and during their transit from source display to display exit aperture:
   a) do not cross paths,
   b) do not overlap and
   c) each beam has a divergence angle that is small enough to avoid user-perceived loss of image contrast due to overlapping of adjacent pixel beams at the retina.

3. The multibeam near-eye or on-eye visual display system of claim 1 wherein the dense array of hollow, divergence-reducing light conduits is created by exposing a fiber-optic bundle to a chemical etchant and selectively removing the fiber cores by chemical etching and leaving the fiber cladding as the hollow conduits.

4. The multibeam near-eye or on-eye visual display system of claim 1 wherein the user's worn or carried display system internally contains any one or more of: microprocessor(s), memory, power-related components, a video camera(s), an audio component, a location or orientation sensor, an eye-gaze or pupil-position sensor, connectors or plugs for external connectivity or services, transmitting or receiving radios, transceivers or antennas for external connectivity or services or for internal connectivity, or any type of corrective lens.

5. The multibeam near-eye or on-eye visual display system of claim 4 wherein the eye gaze or eye pupil position sensor contributes to assuring that a display exit pupil aligns or overlaps an eye pupil.

6. The multibeam near-eye or on-eye visual display system of claim 1 wherein, while wearing the display, the user can view at least one of:
   a) electronic data or images,
   b) his/her actual live surroundings,
   c) both (a) and (b) whether or not along the same line of sight or at the same time.

7. The multibeam near-eye or on-eye visual display system of claim 6 wherein the user, at least one time during display-system use:
   a) sees electronic images or data overlaying, overlaid or associated with objects in his/her real surroundings view or in an electronic data image of his/her surroundings view,
   b) sees targeted electronic images or data or information simultaneously,
   c) sees or hears targeted advertising, possibly simultaneously,
   d) sees or hears live or recorded educational, instructional, entertainment, advisory, guidance or other information
   e) communicates with another person or device such as by making or receiving a live or recorded voice, video or audio/video phone call,
   f) utilizes a social network,
   g) utilizes an online retailer or service,
   h) utilizes an online search engine,
   i) utilizes texting, messaging or email,
   j) utilizes a cloud service or remote server,
   k) utilizes a graphical user interface or web browser,
   l) utilizes speech or voice recognition.

8. The multibeam near-eye or on-eye visual display system of claim 1 wherein the display or any portion thereof includes, is compatible with, incorporates or attaches to vision-corrective eyeglasses or contact lens(es) or to noncorrective eyeglasses, contact lens(es), an eyeglass-like frame, or any head-mounted appliance that can maintain alignment between a display-system exit aperture and at least one eye entrance pupil.

9. The multibeam near-eve or on-eve visual display system of claim 1 wherein a source display or displays utilize one or more display technologies.

10. The multibeam near-eye or on-eye visual display system of claim 1 wherein optical element(s) used to reduce pixel-beam divergence, direct a pixel beam or act as a pixel-beam high-aspect-ratio conduit includes any one or more of:
   a) a faceplate with the fiber cores removed, whether flat or curved, comprising a bundle of hollow-tube light guides formed by the remaining fiber claddings that are closely packed to correspond with the pixel positions of the source display,
   b) a microcapillary plate, whether flat or curved, the microcapillary positions corresponding with the pixel positions of the source display,
   c) a plate which is a fiber-optic faceplate on the beam-entry face and a microchannel plate or plate of hollow light guides on the opposing exit face, whether flat or curved,
   d) a 1:1 array of high-aspect-ratio light conduits each of which is optically coupled to a corresponding source pixel using an additional lens between each source pixel and each light conduit or
   e) any of a, b, c and d in combination.

11. The multibeam near- or on-eye visual display system of claim 1 wherein an optical element that performs or contributes to steering pixel beams at different fixed angles or to different fixed spatial positions includes one or more of:
   a) a refractive or holographic lens or lens array,
   b) an array of light-masking or light-guiding conduits consisting of any of vacuum-, gas- or liquid-filled conduits, fiber-optic faceplate or fiber-optic fiber conduits, opaque-walled filled or unfilled conduits or channels, hollow waveguides, high-aspect-ratio (length divided by diameter) conduits or channels and thin-walled conduits or channels,
   c) a Fresnel lens, a prism or array thereof, or
   d) an aspheric, compound or gradient-index refractive lens.

12. The multibeam near-eye or on-eye visual display system of claim 1 wherein the source display and the array of optical light conduits are either (i) manufactured as one integrated component or (ii) fabricated as separate components that are then fixedly juxtaposed or laminated to each other.

13. The multibeam near-eye or on-eye visual display system of claim 12 wherein the conduits include light-emiitting plasma chambers, phosphor-containing chambers or optically resonant cavities implemented within at least a portion of the optical conduits which thereby serve as emitting source-display pixels.

14. The multibeam near-eye or on-eye visual display system of claim 1 wherein the user sees source-display-provided images of data and his/her surroundings, whether overlaid or not, whether simultaneously or not, for at least a period of use, the surroundings being viewed either directly or in the form of a camera-detected and presented image.

15. The multibeam near-eye or on-eye visual display system of claim 1 wherein potential optical interference in or between incoming pixel beams that are arriving at the retina is avoided by one or more of:
   a) using microchannel, microcapillary or optical-conduit divergence limiters or beam formers having a channel or conduit diameter several times larger than a monochromatic wavelength of the emitted-pixel light to avoid Airy self-interference, b) spacing retinal impacting beams far enough apart to reduce neighbor-to-neighbor interference,
c) making the position locational grid of the retinal pixels irregular relative to a regular grid with fixed spacings,
d) not firing near-neighbor, same-color, monochromatic beams truly simultaneously but instead firing them with a user-imperceptible delay between them,
e) slewing the wavelength of a primary color such that it is instantaneously different than that of a neighboring beam, or
f) using broadband backlighting or broadband color filters.

16. The multibeam near-eye or on-eye visual display system of claim 1 wherein the source-image display is located in front of the eye, regardless of its apparent size, and is one or more of:
   a) capable of switching between a displaying mode and a transparent mode, and the user's actual surroundings may be seen through the source-image display in the transparent mode,
   b) comprised of an image-source display at least part of which can be switched to transparent mode,
   c) not transparent at any time during use,
   d) capable of presenting one or both of data or an actual-surroundings view, whether that surroundings view is through a transparent display portion or is a displayed image of said surroundings.

17. The multibeam near-eye or on-eye visual display system of claim 1 wherein the light conduits are optically coupled to their mating source-image pixels using a pixel-to-conduit optical coupling element at each source pixel.

18. The multibeam near-eye or on-eye visual display system of claim 1 wherein adjacent or nearby pixel beams may temporally operate independently or simultaneously because each pixel beam is delivered to a different position on the retina.

19. The multibeam near-eye or on-eye visual display system of claim 1 wherein the divergence-reducing component comprises an array of conduits which are fabricated using one or more of:
   a. subtractive processes, including:
      i. Chemical etching of optical fibers
      ii. Plasma etching
   b. built-up by additive processes, including:
      i. lithography, (iii) built up layer by layer
      ii. thin-film processes.

* * * * *